United States Patent
Sheard et al.

(10) Patent No.: US 6,208,345 B1
(45) Date of Patent: *Mar. 27, 2001

(54) VISUAL DATA INTEGRATION SYSTEM AND METHOD

(75) Inventors: Nicolas C. Sheard, Palo Alto; Larry J. Fischer, Campbell; Richard W. Matthews, Redwood City; Himabindu Gurla, Sunnyvale; Qilin Hu, Mountain View; Wendy J. Zheng, Cupertino; Boyle Y. Mow, Freemont, all of CA (US)

(73) Assignee: ADC Telecommunications, Inc., Minnetonka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,162

(22) Filed: Jun. 8, 1998

Related U.S. Application Data

(63) Continuation-in-part of application No. 09/060,667, filed on Apr. 15, 1998.

(51) Int. Cl.$^7$ ...................................................... G06F 13/00
(52) U.S. Cl. ........................... 345/356; 709/223; 709/201
(58) Field of Search .................................... 345/348, 349, 345/350, 351, 967, 969, 970, 356, 357, 346, 965; 395/701–704, 710; 709/201, 223, 230, 303, 220–226, 202, 203; 705/7, 76–79, 21, 54, 26, 10, 40, 38; 707/101, 10, 517; 713/200, 156; 712/226

(56) References Cited

U.S. PATENT DOCUMENTS

Re. 36,444 * 12/1999 Sanchez-Frank et al. ........... 345/349

(List continued on next page.)

FOREIGN PATENT DOCUMENTS

WO 97/37303   10/1997 (WO) . ................................ (WO) .

WO 99/15986   4/1999

OTHER PUBLICATIONS (IEEE) The AT&T Satellite Network Control System by Per Brostrup–Jenson and D. Moshenberg, Aug. 1992.*

(List continued on next page.)

Primary Examiner—Raymond J. Bayerl
Assistant Examiner—Tadesse Hailu
(74) Attorney, Agent, or Firm—Altera Law Group, LLC

(57) ABSTRACT

A visual data integration system architecture and methodology is disclosed. The system architecture includes a transport framework that represents a technology-independent integration mechanism that facilitates the exchange of technology-dependent data between disparate applications. A visual interface facilitates the design, deployment, and runtime monitoring of an integrated information system implementation. An integrated information system is developed visually through use of the visual interface by dragging and dropping components within a canvas area of the interface. The components are graphical representations of various telecommunications hardware and software elements, such as information stores, processors, input/output devices and the like. Various components may be packaged together as business extension modules that provide specific business integration capabilities. Interconnections between components are graphically established using a mouse to define sources and destinations of specified data. An underlying configuration/runtime information framework operating above and in concert with the transport framework effectively transforms the graphical interconnections into logical or physical interconnections, which results in the contemporaneous generation of an integrated runtime system. Format neutral data meta-models are employed to model the input and output data requirements of disparate systems and system components so as to remove any cross-dependencies that exist between the systems and technologies implicated in a data integration project. The visual interface enables runtime control and analysis of the business information and system aspects of an integrated system implementation. Visual views onto the live deployment provide consistent management and control for system integrators, business integrators, system managers, and business managers using a single visual interface.

46 Claims, 30 Drawing Sheets

U.S. PATENT DOCUMENTS

| | | | |
|---|---|---|---|
| 4,791,558 | 12/1988 | Chaitin et al. ...................... | 395/705 |
| 5,386,568 | 1/1995 | Wold et al. ........................... | 395/710 |
| 5,524,246 | 6/1996 | Hurley et al. . | |
| 5,590,271 * | 12/1996 | Klinker ................................. | 345/326 |
| 5,684,967 | 11/1997 | McKenna et al. ................... | 345/329 |
| 5,821,937 * | 10/1998 | Tonelli et al. ....................... | 345/356 |
| 5,889,520 * | 3/1999 | Glaser ................................... | 345/349 |
| 5,915,113 * | 6/1999 | McDonald et al. ................. | 395/702 |

OTHER PUBLICATIONS

Gilbert, G., "Business Applications Cross the Border," *Beyond the Enterprise*, 2 pgs. (Oct. 1997).

Greenbaum, J., "Competitive Linking Update: CrossRoads to the Rescue," *Hurwitz Balanced View Research Bulletin*, 6 pgs. (Jun. 1997).

"Managing Emerging Telecommunications Technologies For Competitive Advantage," *Versant Object Technology*, 25 pgs. (1997).

"MQSeries Version 5—The Next Generation," 8 pgs. (Undated).

"ServiceGate™ Retail Service Manager Software," *Bellcore*, 6 pgs. (1997).

"Softwire Distributed Services Environment," *Softwire*, 4 pgs. (1997).

"Versant ODBMS Release 5," *Versant Object Technology*, 8 pgs. (Oct. 1997).

Product Literature, "SAIC Project Profile," http://www.saic.com/telecom/profiles/ebss.html, 1 pg. (Oct. 1997).

Product Literature, "DSET Company Profile," http://www.dset.com/company/profile.html, 11 pgs. (Oct. 1997).

Product Literature, "Crossroads Software," http://www.crossroads–software.com/archsvcs.html, 5 pgs. (Jan. 1998).

Product Literature, "CrossRoads Customer Interaction," http://www.crossroads–software.com/customer interaction.html, 1 pg. (Jan. 1998).

Product Literature, "CrossRoads," http://www.crossroads–software.com/processware.html, 2 pgs. (Jan. 1998).

Product Literature, "CrossRoads Partner," http://www.crossroads–software.com/partner information.html, 2 pgs. (Jan. 1998).

Product Literature, "Aberdeen Group," http://www.crossroads–software.com/aberdeenimpact.html, 3 pgs. (Jan. 1998).

Product Literature, "CrossRoads Managment," http://www.crossroads–software.com/mgmt team.html, 3 pgs. (Jan. 1998).

Product Literature, "Enterprise Management Strategy," http://www.cai.com/products/unicent/whitepap.html, 23 pgs. (Feb. 1998).

Product Literature, "Computer Associates Press Release," http://www.cai.com/press/97dec/jasmine launch.html, 3 pgs. (Feb. 1998).

Product Literature, "Computer Associates Unicenter® TNG," http://www.cai.com/products/tng endorse.html, 6 pgs. (Feb. 1998).

Product Literature, "Computer Associates Product Description," http://www.cai.com/products/unicent/tng ov.html, 8 pgs. (Feb. 1998).

Product Literature, "OPAL Version 2," http://www.cai.com/products/opal/wpl.html, 20 pgs. (Feb. 1998).

Product Literature, "Versant Object Technology," http://www.versant.com/whats new, 27 pgs. (Jan. 1998).

Product Literature, "SAIC The Vision," http://www.saic.com/telecom/index.html, 4 pgs. (Jan. 1998).

Product Literature, "Electronic Bonding," http://www.gteds.com/html/eb.html, 3 pgs. (May 1977).

Product Literature, "CLECs Use Internet Technology to Bond with Bells," http://www.zdnet.com/intweek/daily/970520e.html, 2 pgs.(Jan. 1998).

Product Literature, "MQSeries Business Partners Index," http://www.software.ibm.com/ts/mqseries/partners/partner.html, 1 pg. (Feb. 1998).

Product Literature, "MQSeries in General," http://www-.software.ibm.com/ts/mqseries/library/brochures/business, 3 pgs. (Feb. 1998).

Product Literature, "The MQSeries Systems Management Market," http://www.software.ibm.com/ts/mqseries/library/whitepapers/sysman/, 14 pgs. (Feb. 1998).

Product Literature, "Massachusetts agencies exchange a wealth of data using MQSeries," http://www.software.ibm-.com/ts/mqseries/solutions/mass.html, 3 pgs. (Feb. 1998).

Product Literature, "Landmark Announces Performance Managment Solutin for MQSeries," http://www.software.ibm.com/news/2f46.html, 2 pgs. (Feb. 1998).

Product Literature, "Boole and Babbage," http://www.boole.com/news/current/mqseries.html, 2 pgs. (Jan. 1998).

Product Literature, "Boole and Babbage," http://www.boole.com/news/96%5Farchive/commandmq.html, 2 pgs. (Jan. 1998).

Product Literature,"MSMQ: Interoperability," http://www-.microsoft.com/ntserver/guide/msmq_interoperability,asp, 1 pg. (Jan. 1998).

Product Literature, "Microsoft Windows NT Server," http://www.microsoft.com/ntserver/community/msmqarchive.asp?A=7&B=5, 1 pg. (Jan. 1998).

Product Literature, "Microsoft Windows NT Server," http://www.microsoft.com/ntserver/guide/msmq_rev_patsey.asp?A=7&B=5, 8 pgs. (Jan. 1998).

Product Literature, "Frontec—The AMTrix™ System Technical Overview," http://www.frontec.com/amtrixtechover.html, 5 pgs. (Jan. 1998).

Product Literature, "Frontec—The AMTrix# System," http://www.frontec.com/amtrixsystem.html, 3 pgs. (Jan. 1998).

Product Literature, "Introduction to Messaging and Queuing," http://candy1.hursley,ibm.com:8001 . . . r.cmd/books/HORAA101/, 31 pgs. (Jan. 1998).

* cited by examiner

| NORMAL | NON-URGENT | URGENT | INTERACTIVE |
|---|---|---|---|
| xxx Queue View | | | |
| Record #1 | Record #1 | Record #1 | Record #1 |
| Record #2 | Record #2 | Record #2 | Record #2 |
| Record #3 | Record #3 | Record #3 | Record #3 |
| Record #4 | Record #4 | Record #4 | Record #4 |
| Record #5 | Record #5 | Record #5 | Record #5 |
| Record #6 | Record #6 | Record #6 | Record #6 |
| Record #7 | Record #7 | | |
| Record #8 | Record #8 | | |
| Record #9 | Record #9 | | |

Update   Close

*Fig. 23*

Object Label: Test 1
OID: 4-78-3073735412
Enqueued By: StartWriter
Priority: NON_URGENT
Comment: This is loaded by Startwriter into the queue Object: Test 1
  List: Private List
    Old: OID: 4-78-3073735412
    Time: CREATE_TIME: 05/27/98 16:23:32
    Integer: Priority: 0
    String: Object Label: Test 1
  List: Public List

VISUAL DATA INTEGRATION SYSTEM AND METHOD

STATEMENT OF RELATED APPLICATIONS

The present invention is a Continuation-In-Part of U.S. patent application Ser. No. 09/060,667, filed on Apr. 15, 1998 pending, which is incorporated herein by reference.

FIELD OF THE INVENTION

The present invention relates generally to information systems and, more particularly, to a system and method employing an interface for visually integrating disparate information technologies.

BACKGROUND OF THE INVENTION

A number of proposed solutions have been advanced to address the problem of effecting the communication of data between computer system platforms and applications developed using distinctly different technologies. The increased reliance on distributed data processing systems and architectures, such as those employed to support Internet and Electronic Data Interchange (EDI) activities for example, has created a keenly felt need for an improved approach to designing and deploying an integrated information system capable of transporting vast amounts of data of various types and formats between applications having dissimilar interface characteristics.

In an attempt to address the problem of transporting dissimilar types of data between dissimilar systems and applications, various data interchange products and approaches have been developed. A traditional approach of electronically linking a number of disparate systems together involves the creation of custom gateways or interface systems. A typical custom gateway is created to solve a narrowly focused interface problem, such as permitting systems #1 and #2 to exchange data of types 'A' and 'B' produced by systems #1 and #2, respectively. Such specialized gateways are generally not intended nor designed to accommodate data interchange between a large number of disparate systems and applications. It is understood in the art that modifying an existing custom gateway to address a new and different interface problem is generally unproductive and costly, given the inherent limitations of the original gateway design.

Various information technology standards have been advanced in an attempt to address these and other data interchange problems experienced within a distributed data processing and communications environment. One such standard, referred to in the art as CORBA (Common Object Request Broker), has received much recent attention, as it would appear to solve many of the aforementioned problems. A critical review of the CORBA approach, however, reveals that CORBA is not designed to act as a data transport mechanism. Rather, CORBA is primarily designed to pass control methods over TCP/IP. The strength of CORBA is its ability to use C++ methods over a network. CORBA requires that all applications must be object oriented, which precludes inclusion of a substantial number of existing applications developed using structured programming techniques. Moreover, although CORBA is referred to as a "standard,' there are several product implementations of CORBA which are not compatible, and as such, are incapable of communicating with one another.

Other technologies, such as transaction monitors, have been developed primarily to control complex transactions between multiple applications in a distributed processing environment. Such transaction monitors typically interface applications through rigorous transaction rules applied through defined IDL (Interface Definition Language) interfaces across IPC (Inter Process Communication) methods. A typical transaction monitor has a complex structure that must be conformed to, and is complicated to use and maintain. If any one of the individual transactions that make up a transaction set fails, the entire complex transaction must be backed out, rather than the single failed transaction. Transaction monitors are generally optimized for transaction control, and not for effecting data interchange.

Fourth and fifth generation languages, termed 4GL and 5GL, would appear to offer a partial solution to the data interchange problem. These and other similar languages, such as those used to construct "business objects," are optimized around the construction of applications and user interfaces for the primary purpose of providing powerful querying and reporting tools. The objects created by such languages typically define access paths to data residing in databases. The objects can be combined in various ways to create complex queries and for building powerful report generators. Fourth and fifth generation languages are not well suited for transporting vast amounts of data from one application to one or more other applications in a reliable and efficient manner. Although business objects constructed using 4GL and 5GL techniques do carry with them a certain amount of data, this data is typically data resulting from a query that is transported with an object definition for the purpose of performing additional analysis on the data.

Further complicating the technical problems associated with prior art data integration approaches is the recognition that disparate information sources are typically integrated to serve business needs and objectives. A proposed technical solution to a data integration problem should not inhibit a user's ability to obtain meaningful information derivable from the data passing through the proposed system. On the contrary, a proposed technical solution should meet or exceed the user's business information needs, and furthermore, should provide an extensible framework capable of readily accommodating new information sources and technologies.

Conventional data integration tools are typically designed to reduce the effort and cost expended on integrating dissimilar information systems from a technical perspective, but are generally employed with little or no regard given to the potential limiting impact the resultant solution may have on business information requirements. Business level integration is typically accomplished using tools very different from those employed to effect data integration. Moreover, the runtime environment of a conventional data integration deployment is typically maintained through use of separate set of system administration tools.

Incompatibilities of varying severity often arise in systems in which the technical integration solution rests on a foundation or framework different from that supporting the business integration solution. Such incompatibilities generally limit the user's ability to efficiently interact with a conventionally implemented integrated information system during the design and deployment phases, and significantly complicates the effort of extracting meaningful system and business integration/management information from the system.

There exists a keenly felt need for an improved data integration system and methodology capable of effectively integrating data produced by applications of varying technologies. There exists a further need for such a system and methodology that employs a single intuitive user interface that provides various types of information to users having disparate data input and output requirements. There exists yet a further need for such a system and methodology that is readily extensible and is independent of any current or future technology. The present invention fulfills these and other needs.

SUMMARY OF THE INVENTION

The present invention is directed to a visual data integration system architecture and methodology. The system architecture includes a transport framework that represents a technology-independent integration mechanism which facilitates the exchange of technology-dependent data between disparate applications. A visual interface facilitates the design, deployment, and runtime monitoring of an integrated information system implementation.

An integrated information system is developed visually through use of the visual interface by dragging and dropping component icons within a canvas area of the interface. The component icons are graphical representations of various data processing and telecommunications hardware and software elements. Various component icons may be packaged together in business extension modules to provide users with specific business integration capabilities.

Interconnections between components placed in the canvas area are graphically established using a mouse so as to define sources and destinations of specified data. An underlying configuration and runtime information framework effectively transforms the graphical interconnections into logical or physical interconnections, which results in the contemporaneous deployment of an analogous integrated runtime system. Format neutral data meta-models are employed to model the input and output data requirements of disparate systems and system components so as to remove any cross-dependencies that exist between the systems and technologies implicated in a data integration project. The use of data meta-models in this manner effectively componentizes the systems of the data integration project, thereby permitting interconnections between system components to be established and modified using visual drag-and-drop and meta-model mapping metaphors.

The visual interface provides for runtime control and analysis of the business and technical aspects of an integrated information system deployment. Visual views onto the runtime system deployment provide consistent management and control for a variety of users having different data input/output, reporting, and interface requirements.

In one embodiment, the transport framework comprises a data exchange infrastructure including a number of adapters associated with a corresponding number of applications. Each of the adapters is customized to interface with a corresponding application and transforms the data being transferred between the application and the data exchange infrastructure. Data produced by a particular application is converted from a technology dependent form to a technology independent form by the corresponding adapter.

The data exchange infrastructure receives data in a technology independent form from each of its associated adapters and coordinates the routing of informational content to particular adapters associated with applications that have requested specific informational content. The adapters receiving the informational content from the data exchange infrastructure transform the informational content having the common format into a data format compatible with, or specific to, their associated applications. A queuing mechanism is employed to construct reliable asynchronous or pseudo-synchronous interfaces between disparate applications and systems.

The data exchange infrastructure may apply business rules or logic when processing a request for particular informational content. An application, for example, may require informational content produced by a number of different applications. The data exchange infrastructure obtains, organizes, and processes the multiple source informational content as dictated by user-specific business logic. Changes to processing and organizational requirements for a particular user or application are effected simply by modifying the user-specific business logic, rather than data exchange infrastructure code.

User-specified routing logic may be applied by the data exchange infrastructure to dispatch selected informational content to one or more destination applications. As with the business logic, changes in routing requirements are effected simply by modifying the routing logic, rather than data exchange infrastructure code.

Process monitoring, tracing, and logging are provided to track the progress of data passing through the data exchange infrastructure and to detect and correct processing errors. In the case of a processing anomaly, the data exchange infrastructure effects a rollback of failed transactions to preclude the loss of data. Performance statistics may also be provided. A number of statistics/analysis graphs and business related charts are made available to the user through the visual interface using system and business oriented views.

A wide variety of interfaces may be developed by appropriate deployment of adapters and one or more processing/logic units of the data exchange infrastructure. Proprietary back-end systems having only a single user-interface, for example, may be logically transformed into an open system having multi-user Web intefaces. Unreliable applications may be stabilized by employment of the data exchange infrastructure. Disparate business systems, whether they be archaic or state-of-the-art, may be effectively linked together to create electronic bonding gateways, for example.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 23 and 24 are queue view displays of a queue management utility that permits the user to adjust, correct, or otherwise modify the contents of a common object.

Figure 1:
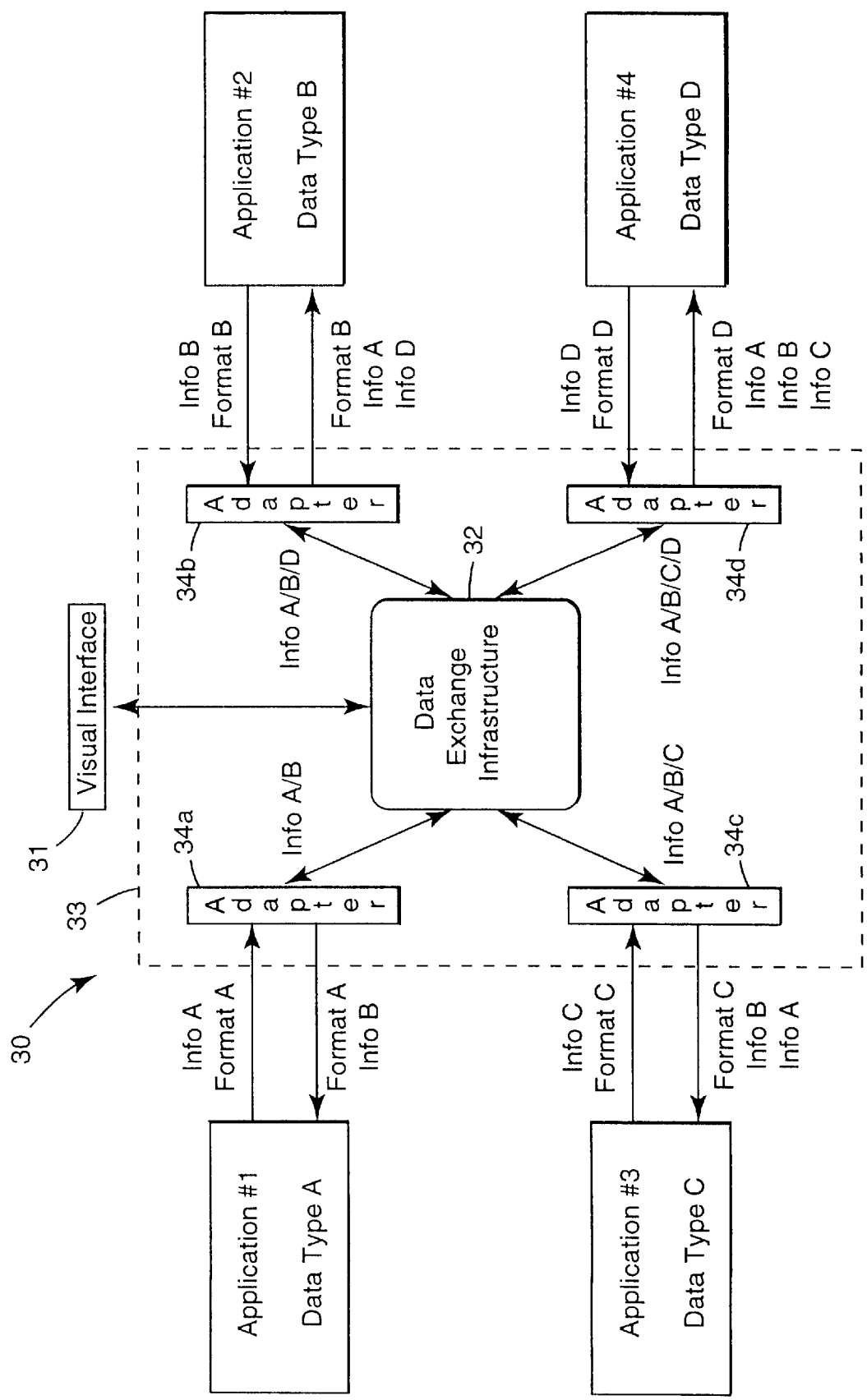
FIG. 1 is a system level diagram of a visual data integration architecture in accordance with an embodiment of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

In FIG. 1, there is illustrated a visual data integration architecture in accordance with an embodiment of the present invention. The system 30 shown in FIG. 1 provides a transport framework 33 and a visual interface 31 to facilitate the design, deployment, and runtime monitoring of an integrated information system comprising a number of disparate applications. In broad and general terms, the transport framework 33 provides a technology-independent integration mechanism that facilitates the exchange of technology-dependent data between disparate applications. The transport framework 33 enables reliable and scalable routing of information between dissimilar applications and technologies.

The visual interface 31 enables the rapid design, deployment, and runtime control and analysis of the business information and system/technical aspects of an integrated system implementation. An integrated information system is developed visually through use of the visual interface 31 typically by the dragging and dropping of component building blocks within a graphical system representation using a mouse or other input device. These component building blocks are graphical representations of various data processing and telecommunications hardware and software elements, such as information stores, processors, input/output devices, bridges, routers, and the like. Interconnections between component building blocks are graphically established typically by use of the mouse to define sources and destinations of specified data.

An underlying configuration and runtime information framework operating above and in concert with the transport framework effectively transforms the graphical interconnections into logical or physical interconnections, which results in the contemporaneous generation of a corresponding runtime system deployment. Once fully configured, and with any necessary customization completed, a click of a button activates the runtime deployment of the integrated information system. Visual views onto the live deployment provide consistent management and control for system integrators, business integrators, system managers, and business managers.

For purposes of illustrating various features and advantages realized when implementing a visual data integration architecture in accordance with the principles of the present invention, it is assumed in FIG. 1 that a number of dissimilar applications, identified as Applications #1, #2, #3, and #4, produce various types of dissimilar data. The term dissimilar applications as used herein is intended to refer to applications that differ in terms of technology, operation, supporting platforms and operating systems, data, input/output interfaces, communication protocols, and the like. The term dissimilar data is intended to refer to data types that differ in terms of format, structure, protocol, content, and the like.

It is further assumed that each of the Applications shown in FIG. 1 requires information produced by other Applications. Application #3, for example, produces informational content 'C' which is required by Application 'D,' and requires informational content 'A' and 'B' produced by Applications #1 and #2, respectively. As such, each of the Applications, although representing distinctly different technologies which may be supported on distinctly different platforms, are dependent upon one another for various informational content. Those skilled in the art well appreciate the difficulties of providing a mechanism to effect the required exchange of information between dissimilar Applications while concurrently addressing a myriad of technological interdependencies.

A traditional approach to implementing a customized interface to effect the exchange of information between two disparate applications generally solves a narrowly focused communications problem, but typically results in an inflexible solution intolerant to even slight changes in terms of format, function, or operation. Prior art solutions to developing such interfaces to permit communication between disparate applications are generally dependent upon the technologies inherent in either or both of the application software and/or platform hardware/software supporting the application. Such technology dependencies are well-understood as significantly limiting the ability to modify, expand, and scale an existing communications infrastructure, and significantly complicates or even precludes the integration of new information sources and technologies.

Moreover, conventional integration tools are generally incapable of integrating disparate information systems in a manner that satisfies both system and business requirements using a uniform and consistent methodology. Such conventional integration tools generally fail to provide an interface that permits the user to efficiently develop an integrated system design, readily perceive various hardware and software components and interconnections of the design, effectively transform a graphical system representation into a live runtime deployment, and monitor the efficacy of the design during both the development phase and subsequent deployment phase.

As will be described in detail hereinbelow, a data integration approach consistent with the principles of the present invention provides a transport mechanism that is entirely free of technology dependencies, and further provides an intuitive visual interface that enables the rapid design, deployment, and runtime control, monitoring, and analysis of the business/information and system/technical aspects of an integrated information system implementation.

With further reference to FIG. 1, it is assumed that Application #1 produces data of type 'A' which may be viewed as comprising two constituent components. The term data, within the context of the environment illustrated in FIG. 1, is assumed to include an informational content component and a format component. The informational content component represents raw information, typically business information, such as accounting information for example. The format component typically represents a technology-dependent construct that provides a means for electronically interacting with the informational content component.

The format component, for example, may be defined to include data structures, protocols, scripts, control codes, and other technology-specific content. It is well appreciate in the art that many so-called "compatible" or "compliant" applications are in truth inherently technology-dependent, thus precluding seamless and reliable transport of information between two or more "compatible" applications. As was previously discussed, even standards-based applications are often incapable of communicating effectively with one another without intervening logic or protocol.

In FIG. 1, Application #1 produces data of type 'A' which comprises informational content 'A' associated with a format 'A.' It is assumed in this illustrative example that Applications #2, #3, and #4 require selected portions of informational content 'A' produced by Application #1. The transport framework 33, which in this embodiment comprises a data exchange infrastructure 32 in cooperation with adapters 34a–34d, facilitates the exchange of required portions of informational content 'A' in the following manner. In response to a request for particular data received by Application #1, selected data of type 'A' is transmitted to the adapter 34a. The adapter 34a processes the type 'A' data in such a way as to eliminate any technology dependencies associated with the type 'A' data. In particular, the adapter 34a disassociates the informational content component 'A,' alternatively referred to as informational content 'A,' from its associated format component 'A,' and transmits only the informational content 'A' to the data exchange infrastructure 32.

In accordance with one embodiment of the present invention, the adapter 34a reformulates the informational content 'A' into a common or generic form which is subsequently operated on by the data exchange infrastructure 32. Each of the adapters 34a–34d performs this process of reformulating a technology-specific data stream into a technology-independent generic or common data form.

Assuming that Application #2 requires selected informational content 'A' produced by Application #1, the data exchange infrastructure 32 facilitates the transport of the content 'A' information to adapter 34b associated with Application #2. The adapter 34b reformulates the informational content 'A' having a common representation to a format 'B' representation which is compatible with Application #2. The adapter 34d, in a similar manner, receives from the data exchange infrastructure 32 specified informational content 'A' reformulated from format 'A' to the common or generic format. Adapter 34d reformulates the informational content 'A' from the common representation to a type 'D' format suitable for incorporation by Application #4. As is also shown in FIG. 1, Application #3 requires selected informational content 'A' from Application #1. The specified informational content 'A' is converted to generic form by the adapter 34a, transmitted through the data exchange infrastructure 32 to adapter 34c, and converted to a format 'C' form for inclusion by Application #3.

It can be seen from FIG. 1 that disparate types of selected data may be effectively and reliably transported between dissimilar applications with relative ease through employment of a data exchange architecture in accordance with the principles of the present invention. The cooperative use of adapters associated with specific applications in conjunction with one or more processing/logic units of the data exchange infrastructure either eliminates or renders innocuous technology dependencies inherent in the data transferred through the data exchange infrastructure. Such an implementation generally eliminates or significantly minimizes the need for customized interfaces otherwise required to facilitate the transport of dissimilar types of data between dissimilar applications. In other words, the traditional N×N connectivity problem associated with traditional interfacing approaches may be effectively reduced to a 1×N connectivity scenario using a data exchange approach consistent with the principles of the present invention.

Figure 2:
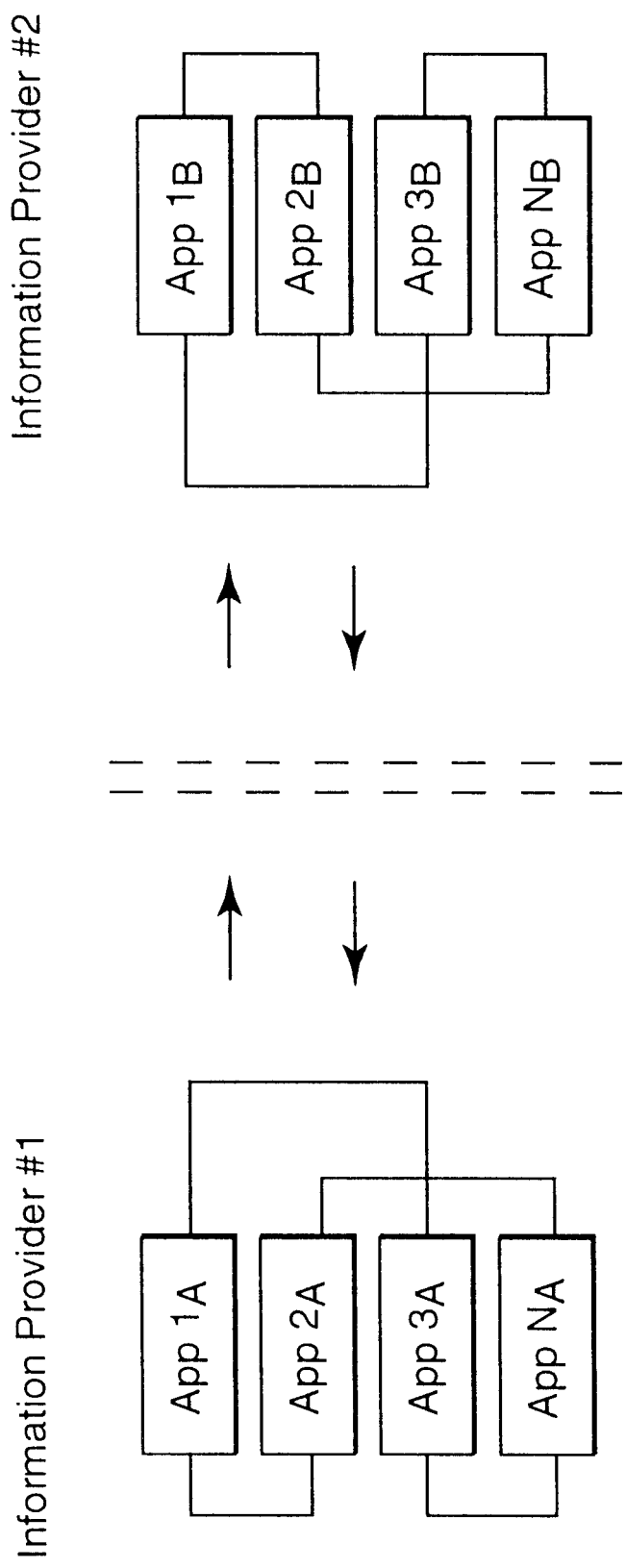
FIG. 2 illustrates in block diagram form the flow of data between disparate applications within information systems operated by two information service providers in accordance with a conventional data integration approach.
Figure 3:
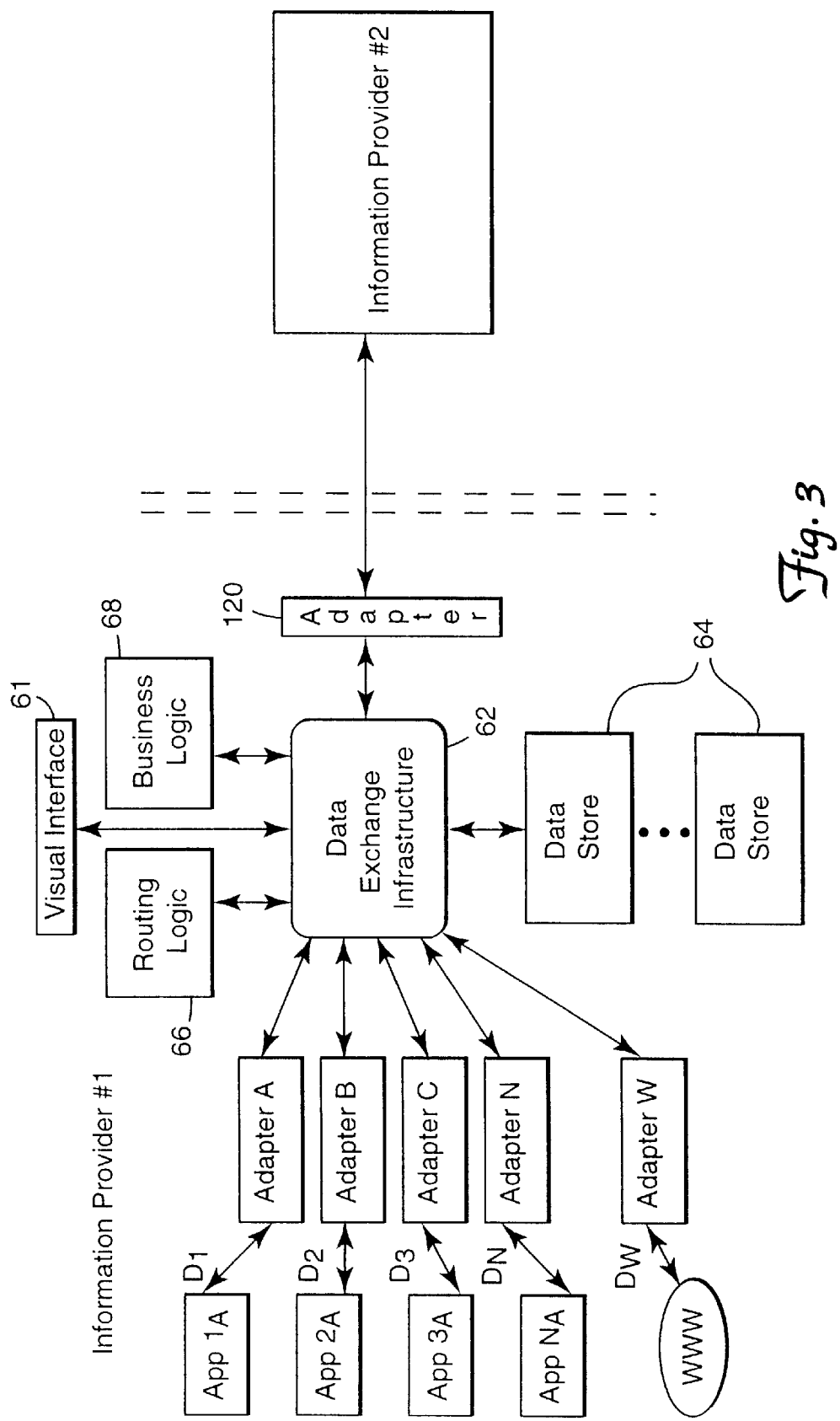
FIG. 3 illustrates the deployment of a visual data integration architecture of the present invention within the information system environment of information provider #1 shown in FIG. 2.

To facilitate a better appreciation for the advantages offered by the data integration infrastructure implemented in accordance with the present invention, reference is made to FIGS. 2–3. In FIG. 2, there is depicted a number of Applications, Applications #$1_A$–#$N_A$, which interact within an information systems environment operated by an information provider #1. Information provider #2 operates an information system within which a number of disparate applications, represented by Applications #$1_B$–#$N_B$, interact in a specified manner. In addition to communicating information within each respective information systems environment, various types of information must be shared between the two information providers #1 and #2.

By way of example, and assuming that information providers #1 and #2 provide telecommunications services, information provider #1 may represent a local exchange carrier while information provider #2 may represent an inter-exchange carrier. It can be appreciated that the information system architecture associated with each of the information providers #1 and #2 typically represents a complex amalgam of archaic or legacy applications in addition to state-of-the-art applications. This hybrid environment has generally led to an increased dependency on customized data integration interfaces, such as custom gateways, needed to facilitate sharing of information between dissimilar applications within a given information provider's operating environment. Even simple modifications to a single application typically has significant upstream and downstream ramifications which often require costly and specialized interfacing solutions.

In the illustrative embodiment shown in FIG. 2, it is assumed that local exchange carrier #1 desires to enter the long distance market to expand its service and customer base. The recently passed Telecommunications Act of 1996, however, mandates that local exchange carrier #1 provide "equivalent" access to its local loops, which permits inter-exchange carrier #2 to gain access to the applications and information supported within the information infrastructure operated by local exchange carrier #1. In order to comply with federal regulations, local exchange carrier #1 must tolerate intrusion into its internal information systems by inter-exchange carrier #2. It can be appreciated that the conventional approach of constructing customized electronic bonding gateways to facilitate communications between two or more dissimilar information provider environments would result in a costly and generally inflexible interface solution.

A data integration infrastructure implemented in accordance with the principles of the present invention greatly simplifies the task of interfacing numerous disparate applications to facilitate reliable communication of information between two information provider environments such as those depicted in FIG. 2. As is shown in FIG. 3, a data exchange infrastructure in accordance with one embodiment of the present invention may be deployed to accommodate the access requirements of inter-exchange carrier #2 and the security considerations of local exchange carrier #1.

This illustrative solution offers a number of advantages heretofore not attainable using conventional interfacing approaches. In particular, expandability, flexibility, and scalability is introduced into the information system environment of the local exchange carrier #1 which was not previously realizable using the original architecture shown in FIG. 2. Moreover, none of the applications or data supported or produced by the applications (i.e., Applications $1_A$–$N_A$) need be changed when deploying a data exchange infrastructure in accordance with the principles of the present invention. Also, the visual interface 61 may be employed to visually develop an integrated runtime system solution, such as that shown in FIG. 3, that mirrors the required functionality and interconnections of the systems shown in FIG. 2 in a efficient and cost effective manner.

In this illustrative example, each adapter A–N is associated with a corresponding data stream $D_1$–$D_N$. Data stream $D_1$, for example, may represent EDI data generated by Application #1 running on a back-end proprietary system. It is understood in the telecommunications industry that EDI represents a generally accepted standard for passing electronic messages between telecommunications service providers. However, it is also understood in the industry that various EDI dialects exist which necessitates some form of data transformation to occur in order to facilitate effective communication between back-end systems.

Adapter A is configured to disassociate the informational content transported within the EDI data stream $D_1$ from its associated EDI format and dialect. The EDI informational content extracted by adapter A is reformatted to a common representation and then transported through the data exchange infrastructure 62 to a destination application within the inter-exchange carrier #2 environment. The adapter 120, in this embodiment, is configured to translate the EDI information content having a common format to an EDI format and dialect required by the destination application. Adapter 120 also converts source EDI information transmitted from inter-exchange carrier #2 into the common or generic form.

The data integration infrastructure depicted in FIG. 3 effectively isolates the proprietary information and systems of local exchange carrier #1 yet provides the required access to inter-exchange carrier #2 mandated by current federal regulations. In addition, deploying the data exchange architecture shown in FIG. 3 provides for the development of new interfaces not contemplated or easily achievable given the limitations of the original system architecture. For example, an adapter, such as adapter W, may be deployed to facilitate communication and data exchange via the Internet. By way of further example, a Web browser interface may be developed to convert a single-user interface of a proprietary back-end system to a multi-user, Web browser interface without the need to modify the back-end system or applications running thereon. A Web browser interface, represented as application WWW in FIG. 3, may thus be implemented with little effort and cost.

Figures 4, 5A:
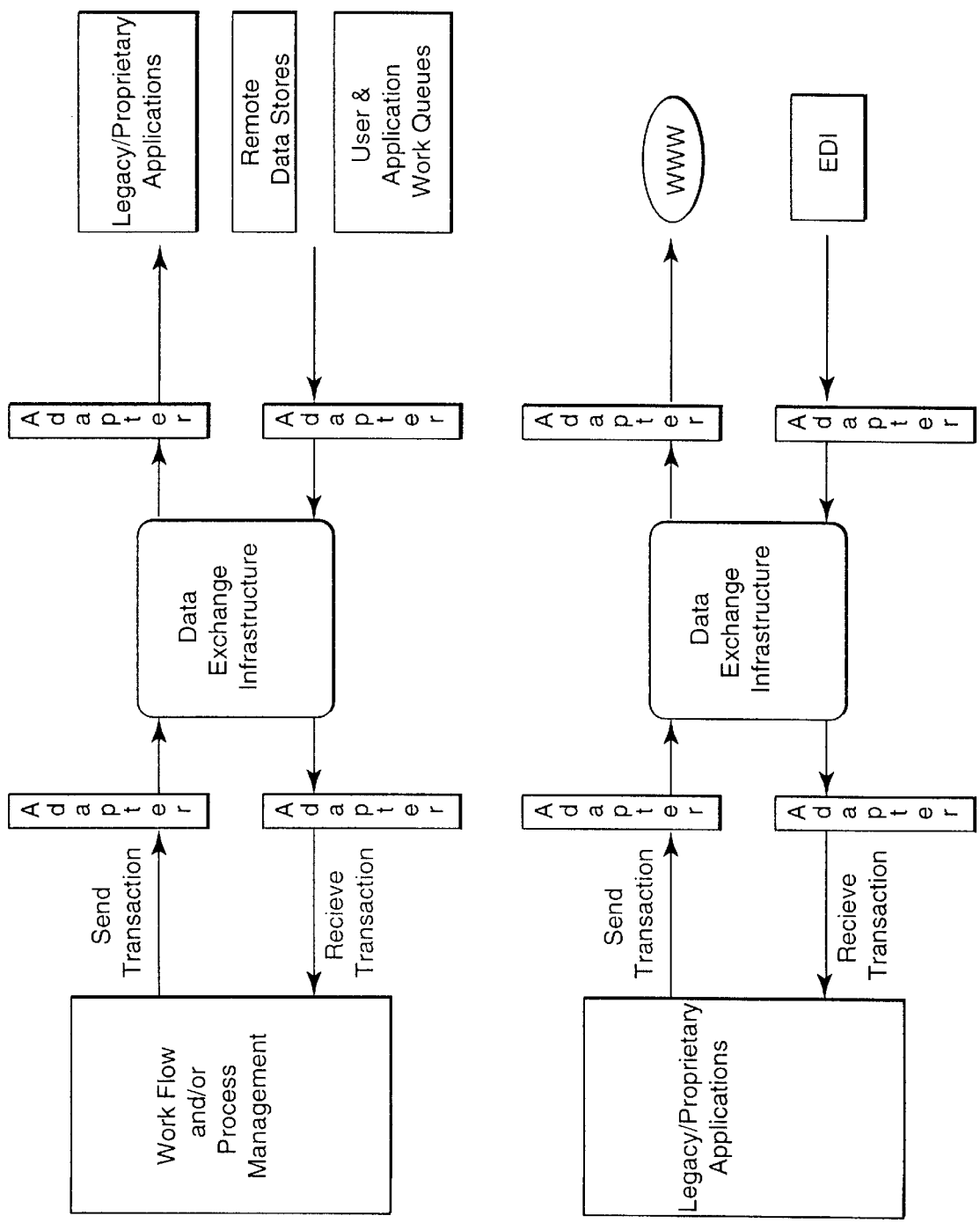
FIGS. 4, 5A, and 5B illustrate additional embodiments of a visual data integration architecture deployed to significantly enhance data interchange within existing information system environments.

In FIG. 4, there is illustrated another embodiment of an information interchange environment within which the data exchange infrastructure in accordance with the present invention may find particular application. The data exchange infrastructure may be implemented to enhance workflow or process management systems which interact with any number of legacy or proprietary applications, remote data stores, or various user and application work queues. In this embodiment, the data exchange infrastructure provides for reliable application integration, data movement, and remote work queues. In this configuration, unreliable system implementations, such as screen scraping applications or networks with poor line condition, may be transformed into reliable implementations through use of the data exchange infrastructure. In particular, this unreliable to reliable conversion is achieved, for example, through the use of persistent queues, rollback processing upon transaction failures, which provides for transactional integrity, and transaction retry processing as necessary.

FIG. 5A depicts a data exchange infrastructure implemented within an existing information exchange environment. In this illustrative example, a data exchange infrastructure is implemented to provide reliable interfaces between legacy or proprietary applications and newer interfaces, such as Web-based interfaces. In this regard, archaic or legacy applications may be provided with state-of-the-art interfaces to facilitate substantially enhanced user interaction.

In this example, an EDI data stream is processed through the data exchange infrastructure as a received transaction initiated by a legacy or proprietary application. In response to a user inquiry, for example, selected data generated by the legacy or proprietary application is processed through the data exchange infrastructure to provide user access through a Web-based interface. As in previous examples, neither the EDI data nor the legacy/proprietary applications require modification, as all accommodations to dissimilar data formats and applications are provided for through the data exchange infrastructure.

Figure 5B:
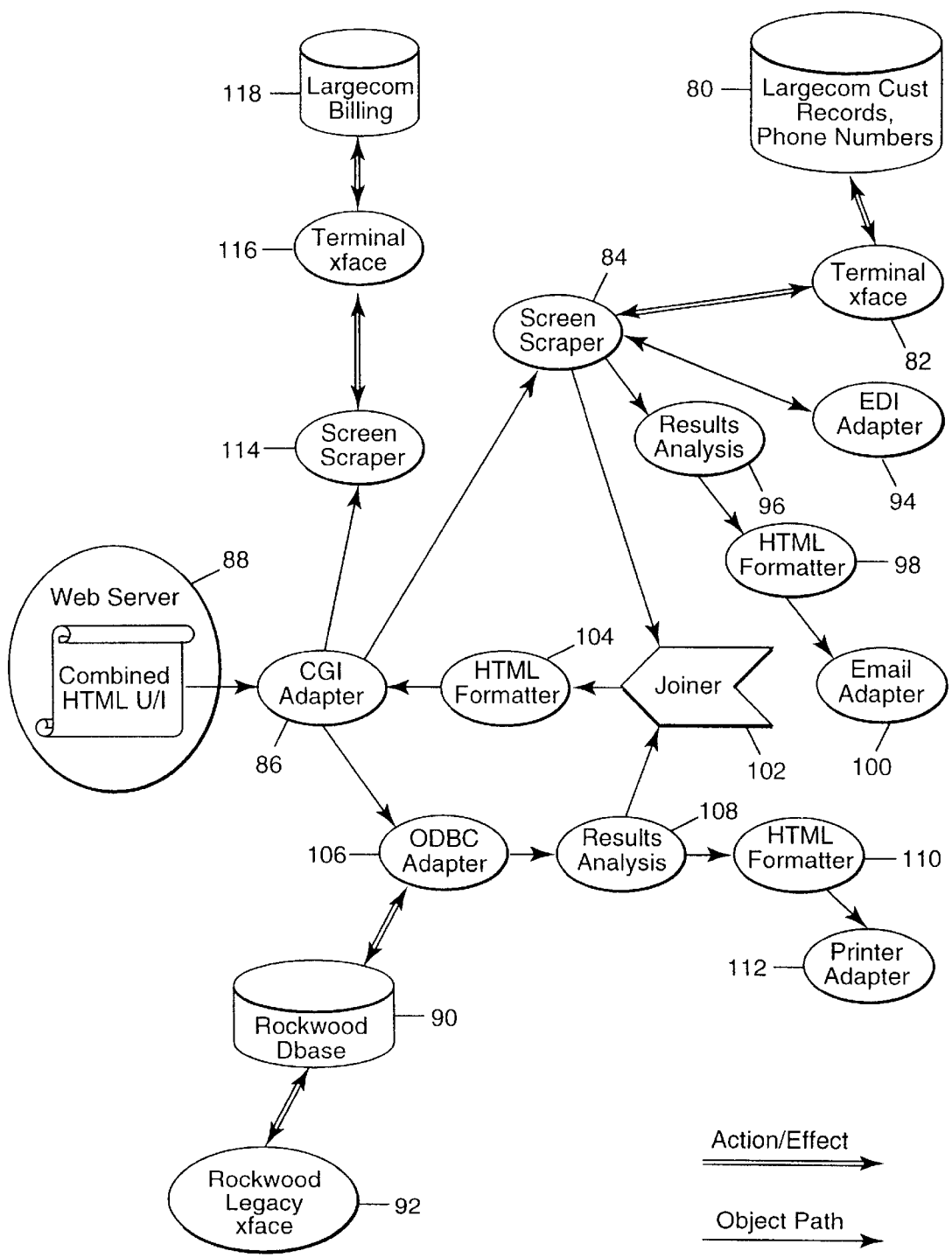

FIG. 5B is an illustration of a data integration architecture implemented to significantly enhance the functionality of, and accessibility to, a back-end, proprietary information system managed by a telecommunications service provider. In this illustrative example, customer phone number records are maintained using a back-end system 80 that are accessible only through use of a single-user terminal interface 82. In accordance with a traditional approach of transferring customer phone number information from the back-end system 80 to a database system managed by another service provider, such as database 90, selected customer phone number records are printed on paper, dispatched via facsimile or by mail, and manually re-entered into the database 90 using an attached user-interface 92.

A data integration approach consistent with the principles of the present invention wholly obviates the duplicative manual re-entering of customer phone records into database 90, and greatly enhances the functionality of, and accessibility to, the two disparate applications 80, 90. As is shown in FIG. 5B, a screen scraper 84 is employed to transform the otherwise single-user terminal interface 82 into an interface that provides interconnectivity with multiple applications and interfaces. An EDI adapter 94, for example, may be connected to the screen scraper 84 to provide EDI formatted customer phone number data to another telecommunications service provider. By way of further example, information obtained by the screen scraper 84 may be processed by a results/analysis module 96, and the processed data may be formatted by an HTML (Hypertext Markup Language) formatter 98. The HTML formatted data may then be communicated to various Email recipients via an Email adapter 100.

The proprietary database 90 may be effectively, yet securely, opened up for enhanced usage using an ODBC (Open Database Connectivity) adapter 106. Information extracted from database 90 and processed by the ODBC adapter 106 may be transmitted to a joiner module 102. Information extracted from the customer phone record system 80 using the screen scraper 84 may also be transmitted to the joiner module 102. A composite data stream produced by the joiner module 102 may then be formatted by an HTML formatter 104 which, in turn, communicates the formatted composite data stream to a CGI (Common Gateway Interface) adapter 86.

Selected customer phone record information may be transported between system 80 and a disparate billing application 118 via CGI adapter 86 and screen scraper 114 coupled to terminal interface 116. The CGI adapter 86 provides connectivity to a Web server 88 to facilitate the exchange of data amongst the disparate applications depicted in FIG. 5B.

Figure 6:
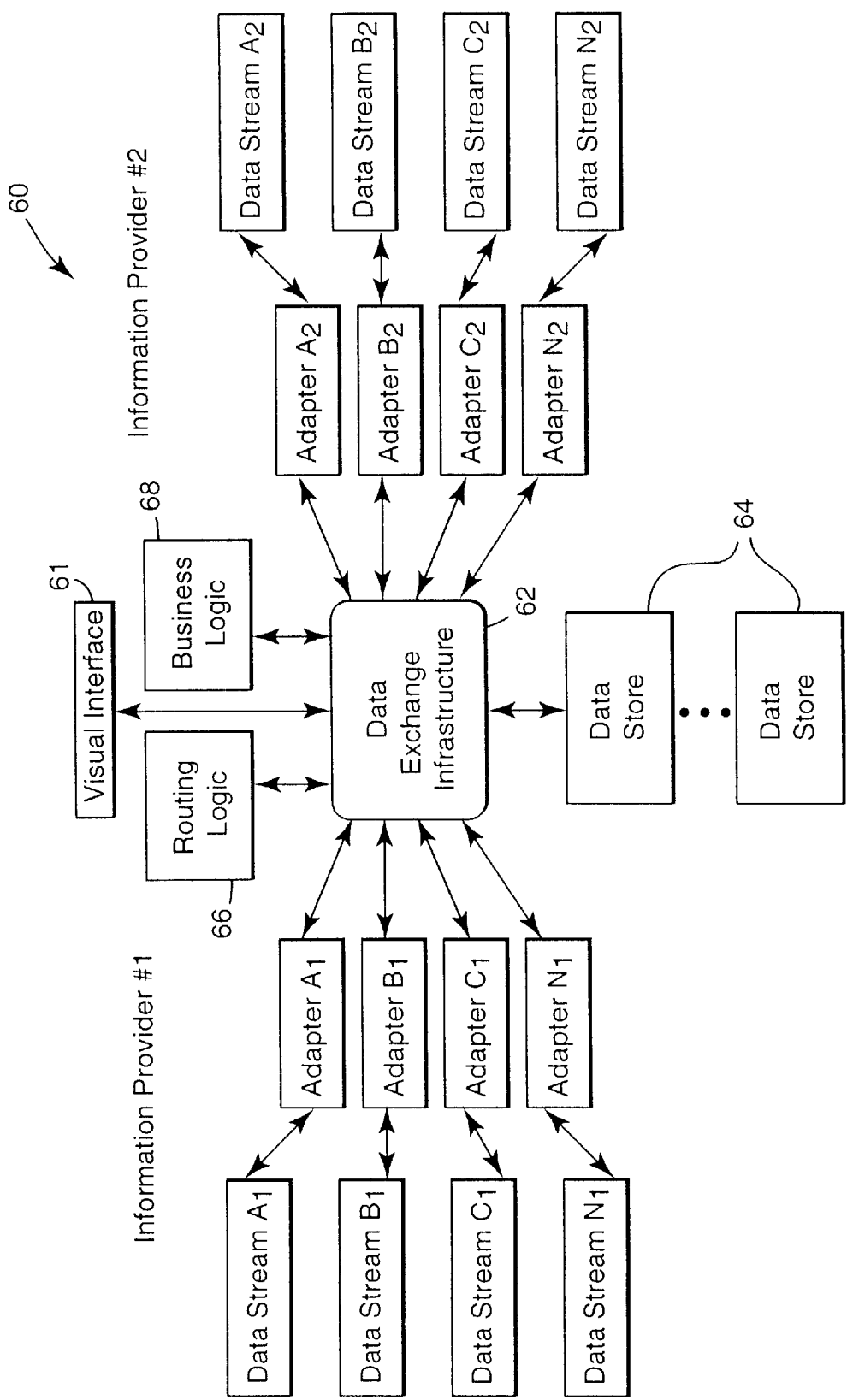
FIG. 6 is a system block diagram of a visual data integration architecture in accordance with another embodiment of the present invention.

Referring now to FIG. 6, there is illustrated an expanded depiction of one embodiment of a visual data integration infrastructure implemented in accordance with the principles of the present invention. In this embodiment, the visual data integration infrastructure provides for the effective and reliable transport of information among any number of disparate applications, data streams, and platforms associated with two or more information providers. Information provider #1, for example, produces data streams of various types which, when processed by associated adapters, are received by a data exchange infrastructure 62 in a generic or common format. Associated with each of the data streams produced by information provider #1 is control or request information which is further processed by the data exchange infrastructure 62. The information or raw data component associated with the control or request information is buffered in a data store 64.

The data exchange infrastructure 62 cooperates with a routing logic module 66 to determine one or more destination applications within the information provider #2 systems environment that require particular data streams from information provider #1. It is noted that the content of a particular data stream, such as data stream $A_1$, may have been requested by more than one information provider #2 application. Assuming that three such applications within the information provider #2 systems environment have requested all or selected portions of the data stream $A_1$ content, three corresponding adapters are employed to convert the data stream $A_1$ content from a generic format into corresponding pre-determined formats specified for the three destination applications.

The data exchange infrastructure 62 also cooperates with a business logic module 68 to process the content of one or more data streams in a particular manner desired by a user. By way of example, an application running within the system environment operated by information provider #2 may require data that is derived through computation or manipulation from data streams $B_1$ and $C_1$ produced by corresponding applications running within the system environment operated by information provider #1. The data exchange infrastructure 62 operates on data streams $B_1$ and $C_1$ in the manner dictated by user-specified business logic stored in the business logic module 68.

In contrast to a custom interface implemented in accordance with a prior art approach, the data exchange architecture illustrated in FIG. 6 and in other Figures provides a system administrator or end-user the ability to modify routing logic, business logic, or the format of a given data stream/application without requiring any modification to programs or configurations within the data exchange infrastructure 62. By way of example, if an application or format of a particular data stream requires modification, such a change may be accomplished in the data exchange architecture by simply modifying the interface logic of the implicated adapter, typically through use of the visual interface 61.

If, by way of further example, a particular data stream produced by information provider #1 is required by two, rather than one, application within the information provider #2 systems environment, a simple change to the routing logic 66 and the addition of another adapter may be effected to satisfy this additional need. Further, if new or additional processing is required for a particular data stream in order to satisfy a new need by either a source or destination application, a simple change to the business logic 68 will satisfy this additional need. Such modifications to the routing logic, business logic, and adapter logic may be effected using the visual interface 61.

It is to be understood that the data exchange infrastructure 62 is typically, but not necessarily, implemented in a distributed manner. In accordance with a distributed approach, various components of the routing logic module 66 and the business logic module 68 may be distributed amongst different logical or physical locations within the infrastructure 62, such as on different workstations, for example. It is to be further understood that the data store 64 may also be implemented in a distributed manner, such that storage elements of the infrastructure 62, such as the various defined queues for example, may be stored at different logical or physical infrastructure locations, such as at locations within different workstations. A distributed data store 64 provides for a highly scalable data exchange infrastructure which may be readily implemented within a distributed network system architecture.

It will be appreciated by the skilled artisan that the cooperation between easily modifiable adapters and one or more processing/logic units of the data exchange infrastructure having user-modifiable routing and business logic provides for enhanced scalability, expandability, and flexibility to meet current and future information exchange requirements. In contrast to conventional interfacing schemes, a data exchange architecture implemented in accordance with the present invention is not subject to obsolescence, primarily due to its inherent ability to readily accommodate new and unforeseen applications, platform technologies, data types and formats, and logic and routing requirements.

Figure 7:
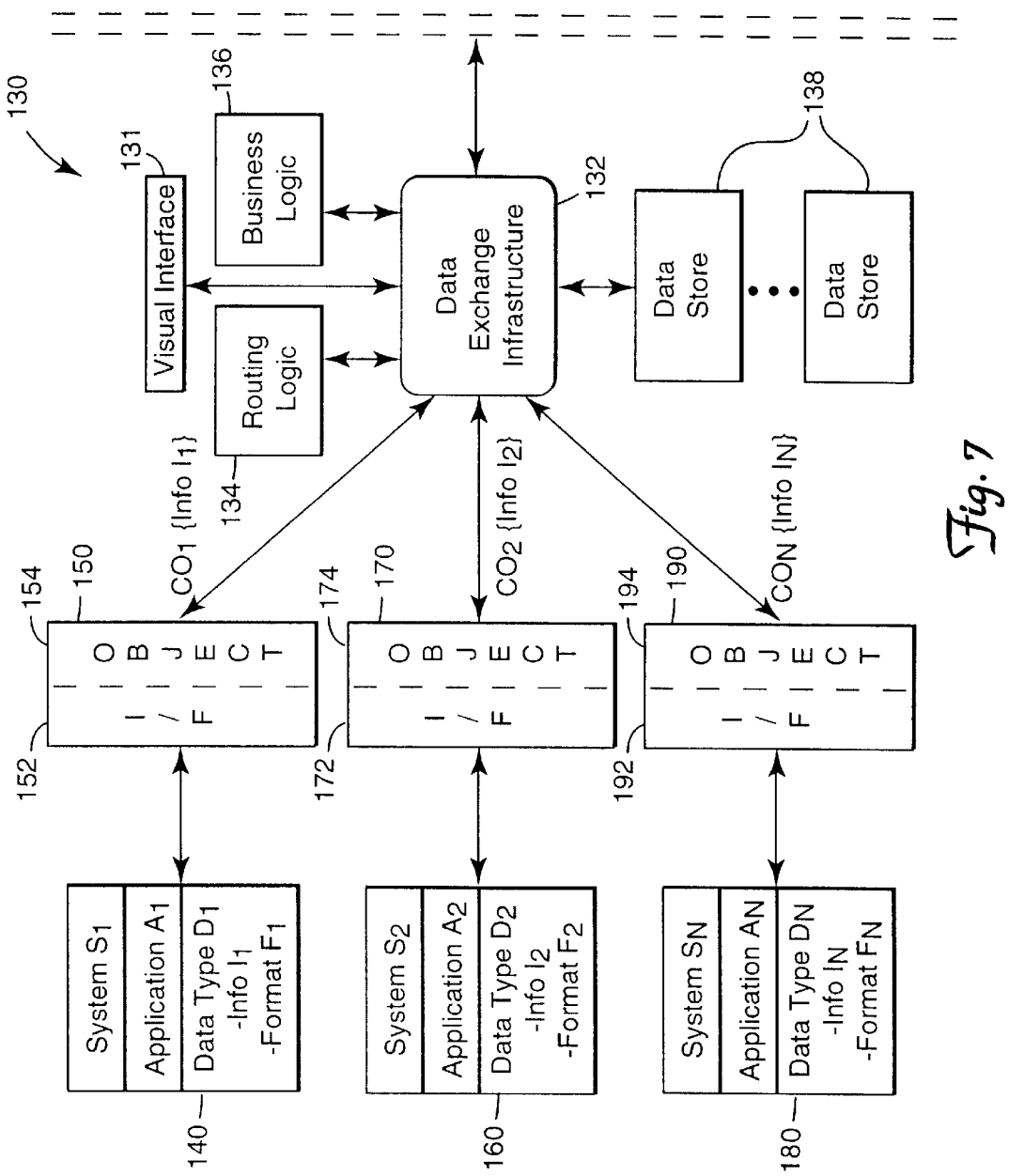
FIG. 7 is a depiction of a number of adapters operating in cooperation to effect data exchange in accordance with one embodiment of the present invention.
Figure 10:
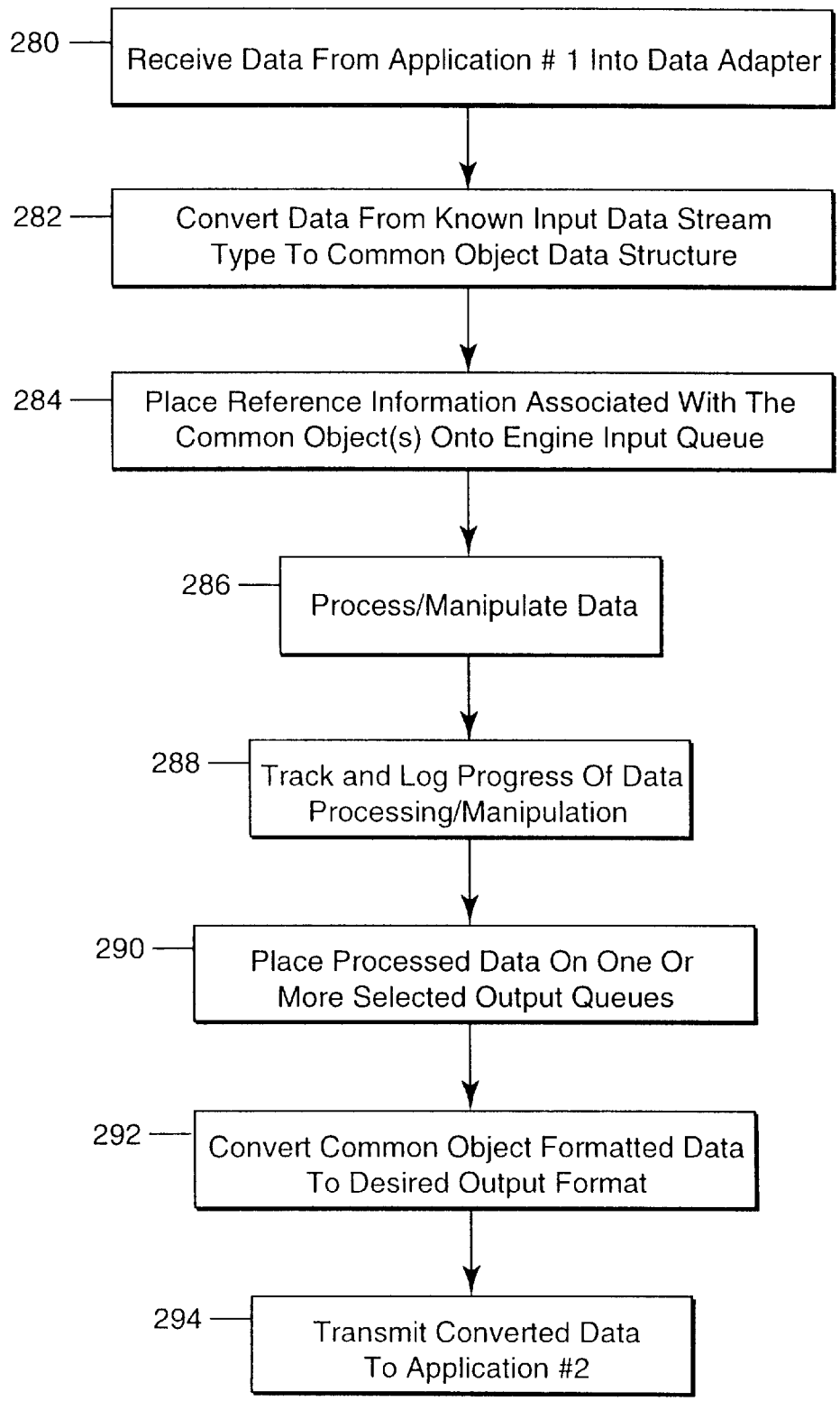
FIGS. 10–11 are flow diagrams illustrating various processes involving the transport of data through a data exchange infrastructure in accordance with two additional embodiments of the present invention.

A more detailed description of various aspects of an adapter in accordance with one embodiment of the present invention will now be described with reference to FIGS. 7 and 10. In FIG. 7, there is shown a number of systems, $S_1$–$S_N$, which may or may not be similar in terms of platform configuration. Each of the systems, $S_1$–$S_N$, implements one or more applications, $A_1$–$A_N$, that produce various types of data, denoted as $D_1$–$D_N$. As was discussed previously, each of the data types has an associated informational content component and format component, such as informational content component $I_1$ and format component $F_1$ associated with data type $D_1$.

Each of the adapters 150, 170, 190 includes an interface module 152, 172, 192 and an object converter 154, 174, 194, respectively. As is shown in FIG. 10, data of type $D_1$ produced by application $A_j$, for example, is received 280 by the interface module 152 of adapter 150. The interface module 152 typically includes a validation module which validates the type $D_1$ data received from application $A_1$. The object converter 154 converts 282 the informational content component $I_1$ of the type $D_1$ data to a Common Object data structure, $CO_1$. Reference information, which may be viewed as control or identification information, associated with the Common Object or Objects is placed 284 onto an input queue of the data exchange infrastructure 132.

The data exchange infrastructure 132 processes and/or manipulates 286 the informational content $I_1$ of the type $D_1$ in a manner required by the business logic module 136. Routing logic 134 is used by the data exchange infrastructure 132 to place 290 the processed informational content $I_1$ on one or more selected output queues (not shown). One or more adapters (not shown) having a structure equivalent to adapter 150 and individually configured for specified destination applications convert 290 the informational content $I_1$ from the common format to a specified output format for transmission 294 to one or more destination applications.

Figure 8:
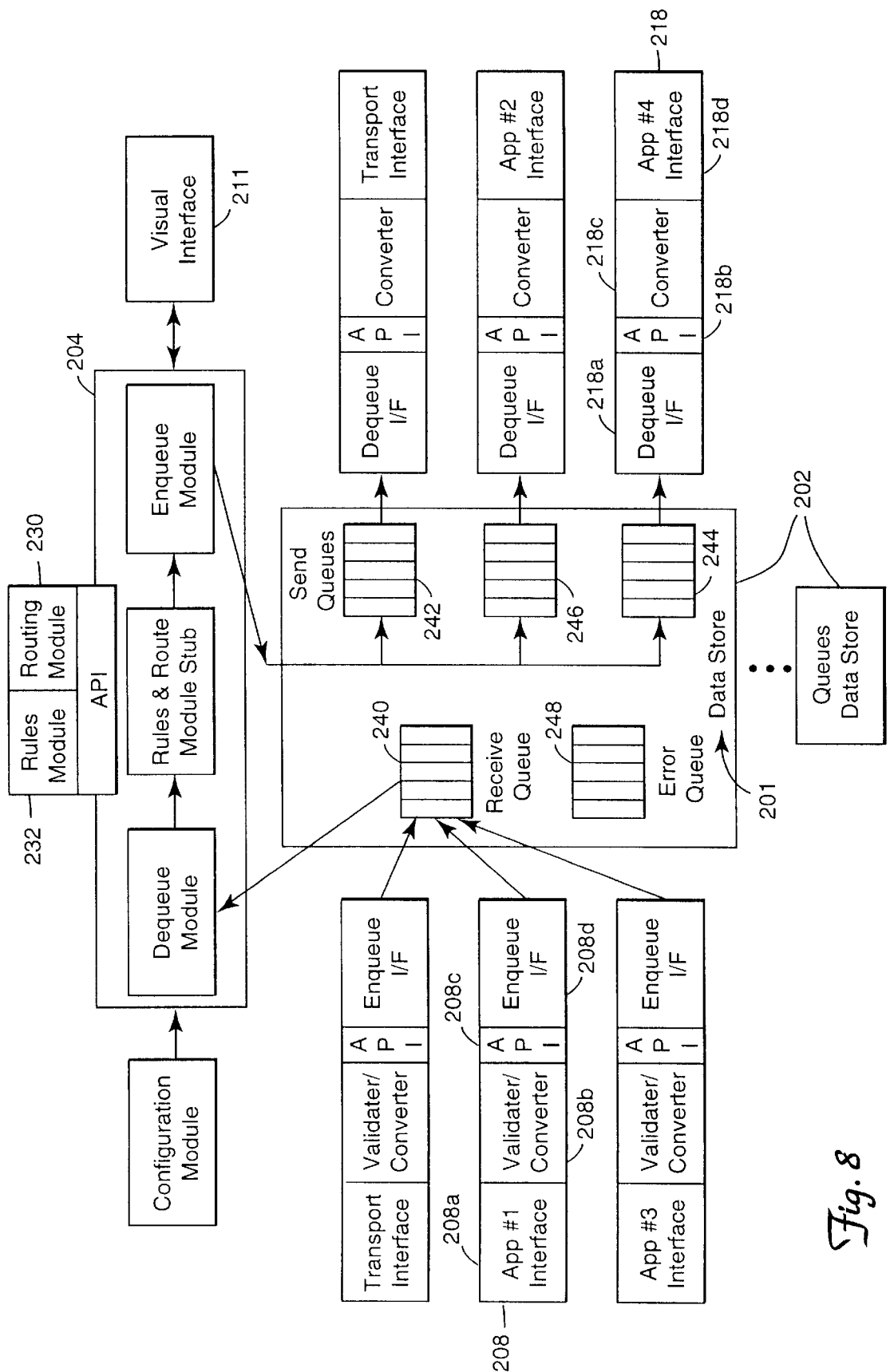
FIG. 8 is a detailed system block diagram of another embodiment of a visual data integration architecture implemented in accordance with the principles of the present invention.
Figure 9:
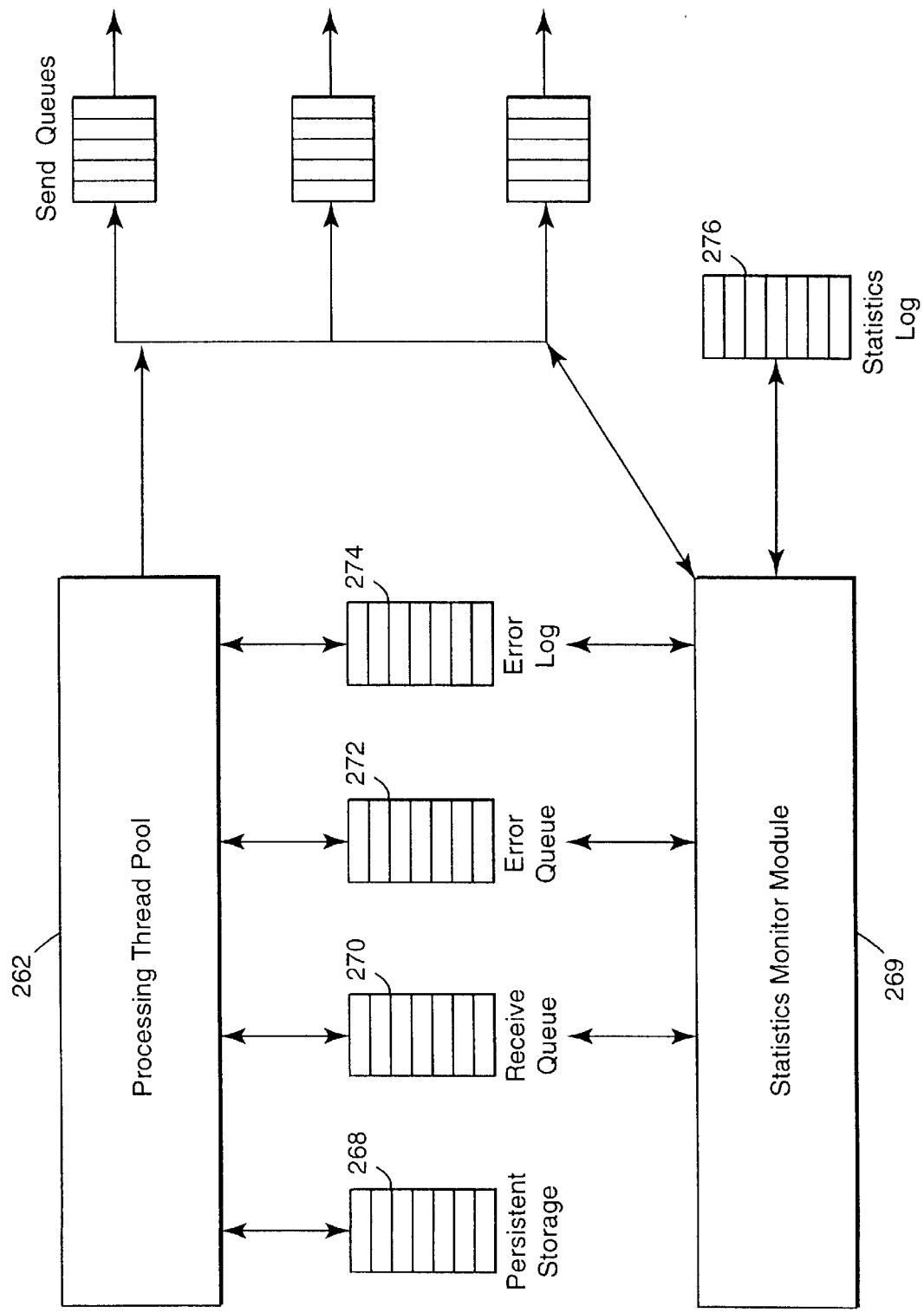
FIG. 9 illustrates additional details concerning various control and queuing features of a visual data integration architecture implemented in accordance with the principles of the present invention.
Figure 11:
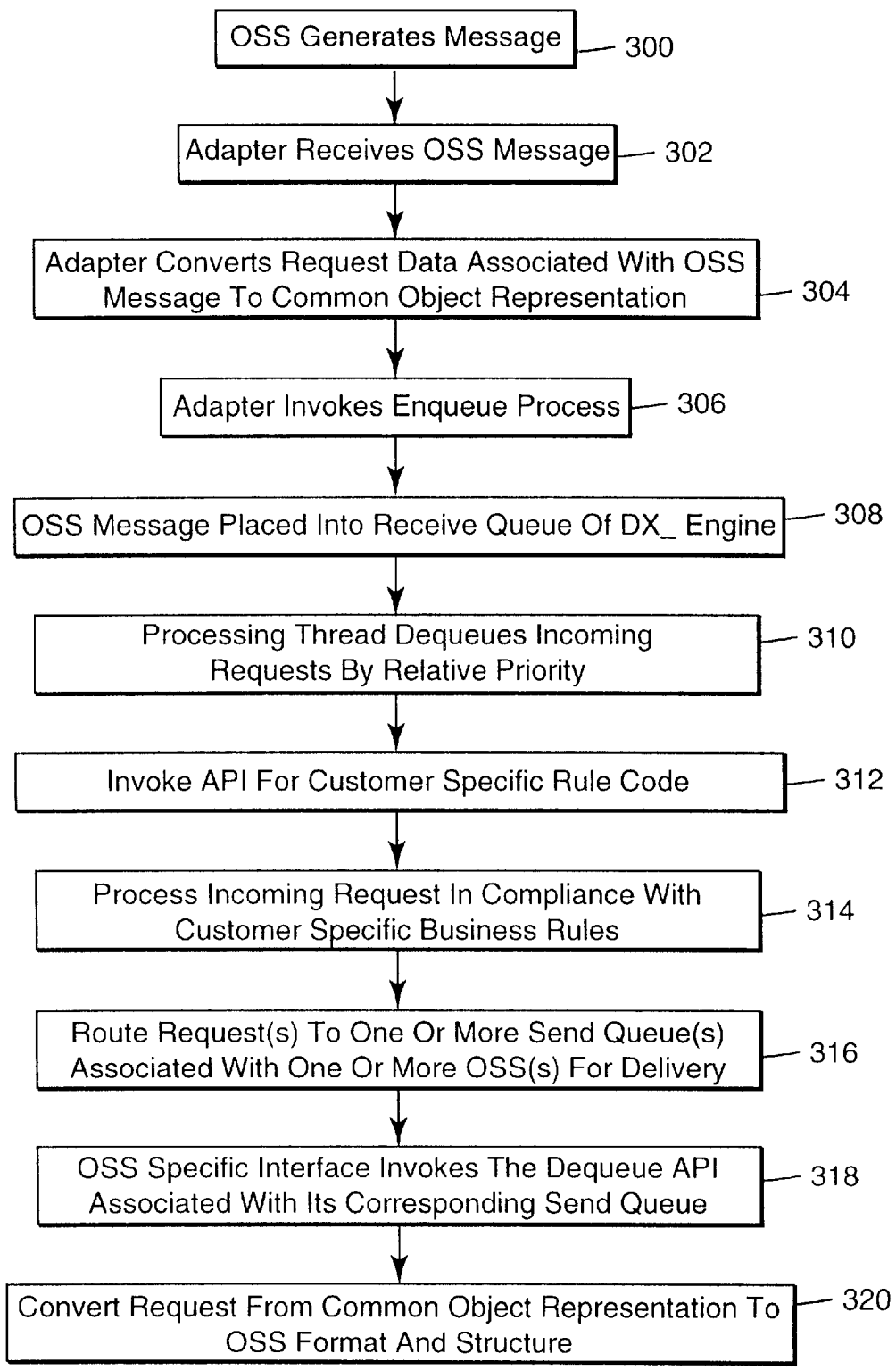

FIGS. 8, 9, and 11 provide additional details of various data exchange operations associated with one embodiment of the present invention. Initially, an adapter, such as adapter 208, receives 300 an externally generated message from an application, such as an Operation Support System (OSS) application, of a destination service provider. The adapter 208 receives 302 the message generated by the OSS. The application interface 208a of the adapter 208 receives the OSS message and data associated with the OSS message transmitted from the OSS. The OSS message and/or associated data is validated and converted 304 to a Common Object representation by the validater/converter 208b of the adapter 208.

The API (Application Program Interface) 208c of the adapter 208 represents an application programmer's interface that allows Common Objects to be readily constructed, manipulated, and enqueued. After the request has been converted into Common Object form, the adapter 208 invokes 306 an enqueue interface 208d to place the OSS message into the receive queue 240 of the data exchange infrastructure 202. The informational content component or raw data associated with the OSS message is transferred to the data store 201 coupled to the data exchange infrastructure 202. It is noted that FIG. 8 illustrates the distributive capability of the data exchange infrastructure of the present invention. In particular, the queues 240, 242, 244, 246, 248 and the data store 202 may be distributed at different physical and logical locations within the data exchange system implementation, such as on different workstations or processors/memories located at logically or physically distinct network system locations.

A processing thread received from a processing thread pool 262 from the gateway core 204 is implemented 310 to dequeue any incoming requests by relative priority. The API for the custom-specific rule code is then invoked 312 to process the incoming request in compliance with customer-specific business rules received from the rules module 232. After the business rules have been applied, requests to one or more destination OSS applications are then routed 316 to a corresponding send queue 242, 244, 246 for delivery. An adapter, such as adapter 218, associated with a specific destination OSS may then invoke a corresponding dequeue API 318 associated with its corresponding send queue 244. The API 218b and converter 218c cooperate to convert 320 the requested information represented in Common Object form to a format and structure specified by the particular OSS. The converted data is then transmitted from the application interface 218d of the adapter 218 to its corresponding OSS.

Figure 12:
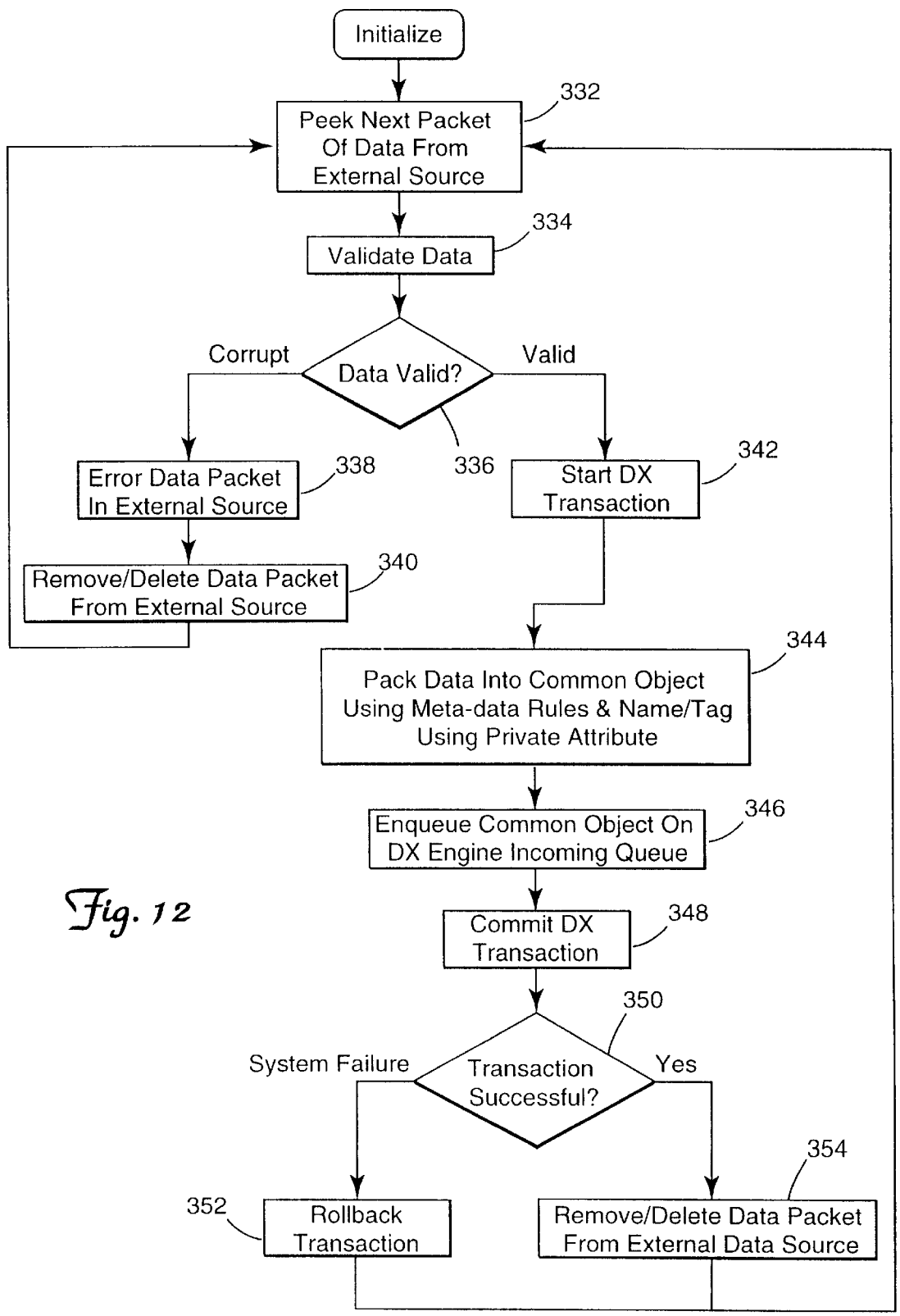
FIGS. 12–14 illustrate in flow diagram form various processes involving the transport of data through a data exchange infrastructure in accordance with a further embodiment of the present invention.
Figure 13:
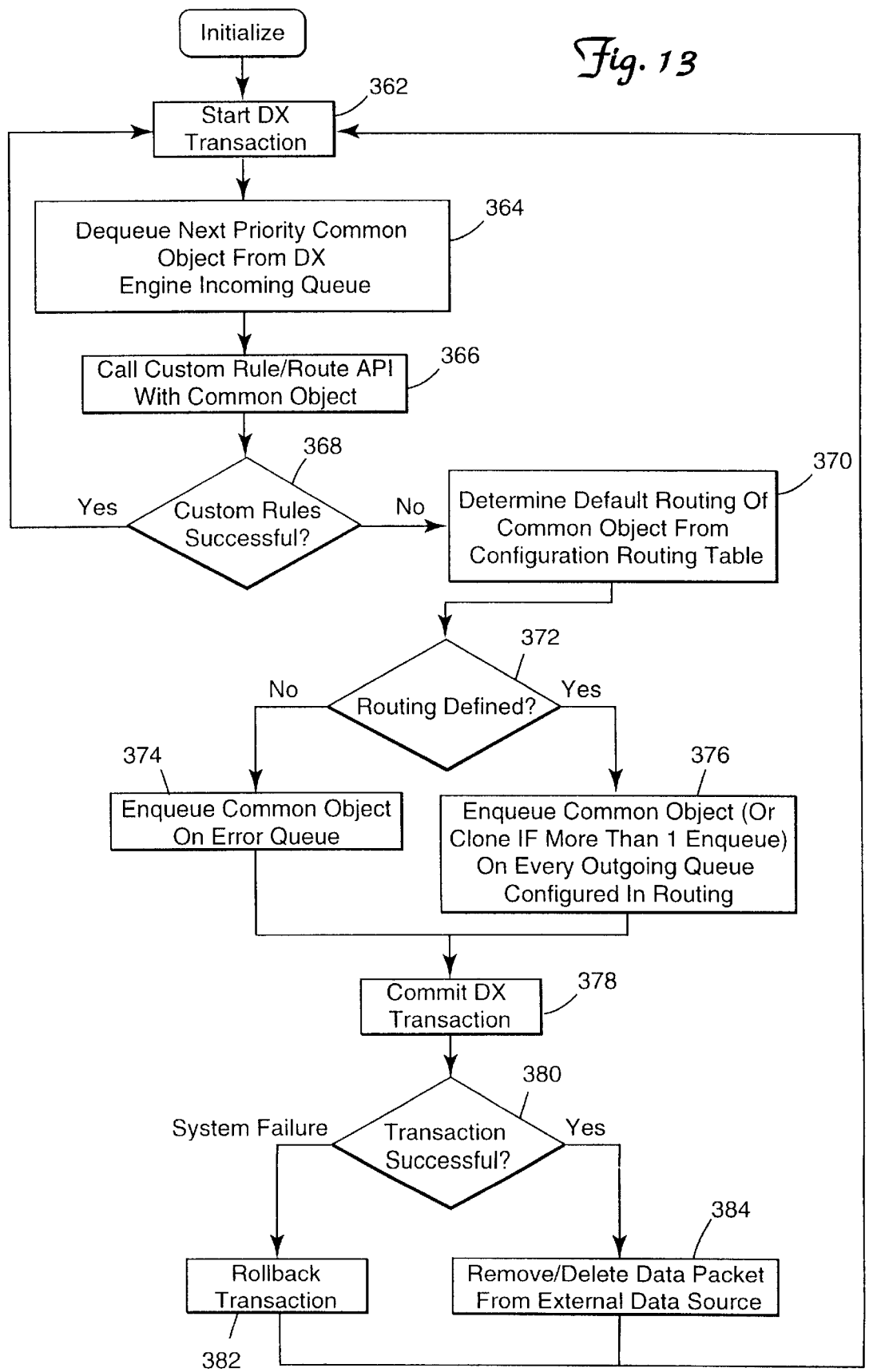
Figure 14:
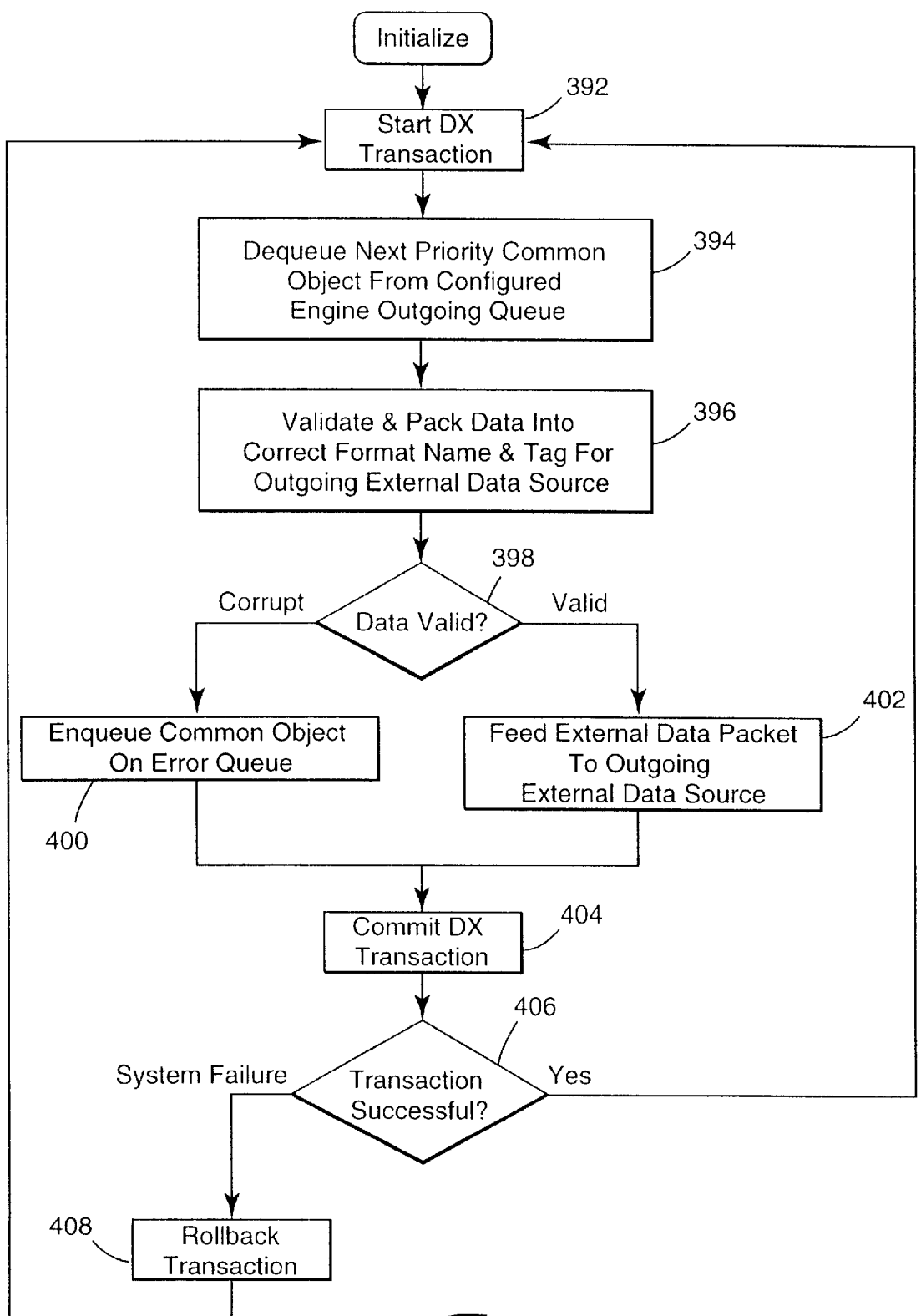

FIGS. 12–14 provide additional processing details concerning the transport of data through employment of a data exchange infrastructure in accordance with an embodiment of the present invention. As is shown in FIG. 12, a packet of data is received 332 from an external source. The received data then undergoes a validation process 334. If the data is considered corrupt 336, an error in the data packet received from the external source is verified 338, and, in response, is removed or deleted 340 for purposes of further processing. If the data from the external source is determined to be valid 336, a data exchange transaction is then initiated 342.

The data received from the external source is then packed 344 into a Common Object in accordance with meta-data rules and identified using a unique name or tag. The Common Object is then enqueued 346 on the incoming queue of the data exchange infrastructure. The data exchange transaction is then committed. If the transaction is not successful 350, a rollback of the transaction is then initiated 352. If the transaction is successful 350, the data packet from the external data source is then removed or deleted 354. The above-described process is then repeated for subsequent data packets received from the external source 332.

Referring now to FIG. 13, additional details concerning a data exchange transaction will now be described. When a data exchange transaction is initiated 362, a prioritization scheme is employed to dequeue 364 the next Common Object from the incoming queue of the data exchange infrastructure. During the dequeue operation, the custom rule/route API associated with the Common Object is called 366. If the custom rules are successfully applied 368, another data exchange transaction is initiated 362. If the custom rules cannot be applied successfully 368, the data exchange infrastructure 370 determines the default routing of the Common Object from the configuration routing table.

If the routing has not been previously defined 372, the Common Object is enqueued 374 on an error queue. If routing has been previously defined 372, the Common Object, or a clone of the Common Object if more than one enqueue operation is applicable, is enqueued on every outgoing queue identified in the routing table. The data exchange transaction is then committed 378 and if successful 380, the associated data packet is removed or deleted 384 from the external data source. If the data exchange transaction is not successful 380, rollback of the transaction is initiated 382. A subsequent data exchange transaction 362 is then initiated.

Additional steps associated with Common Object dequeueing are shown in FIG. 14. Assuming that a data exchange transaction has been initiated 392, the data exchange infrastructure dequeues 394 the next priority Common Object from a configured outgoing queue. The data associated with the Common Object in the outgoing queue is then validated 396 and packed into a specified structure having a format and name appropriate for the outgoing or destination external data source. If the data validation process is not successful 398, then the data is deemed corrupt and the Common Object is enqueued 400 on the error queue. If the data is valid 398, the external data packet is transmitted 402 to the outgoing or destination external data source. The data exchange transaction is then committed 404 and if deemed successful 406, a subsequent data exchange transaction is initiated 392. If unsuccessful, the transaction is subject to rollback 408 by the infrastructure exchange.

Referring once again to FIG. 9, a processing thread pool 262 stores a number of processing threads which are selectively implemented when performing dequeue operations. The processing thread pool 262 represents a pool of threads whose number is externally controlled. Its function is to provide a thread of control for the custom logic portions of the system. One or more processing threads control the dequeueing of requests, the invocation of the rule/routing stub API, and the enqueueing of send requests. A processing thread may make use of additional system resources, including persistent storage 268, writing to and reading from the error queue 272, and writing to an error log 274.

Also shown in FIG. 9 is a statistics monitor module 264 and an associated statistics log 276 which are used to provide monitoring and tracking of data as it moves through the data exchange system. The statistics monitor module 264 also provides historical performance information on queues and historical information on system resource usage. The statistics monitor module 264 provides a means for logging and tracing a given application. Logging reveals the state of the application at the time of an error, while tracing provides a description of all software events as they occur. The tracing information may be used for tracking the application, state, and other related operations. The tracing information may be used in conjunction with the logging information to determine the cause for an error since it provides information about the sequence of events prior to an error.

Figure 15:
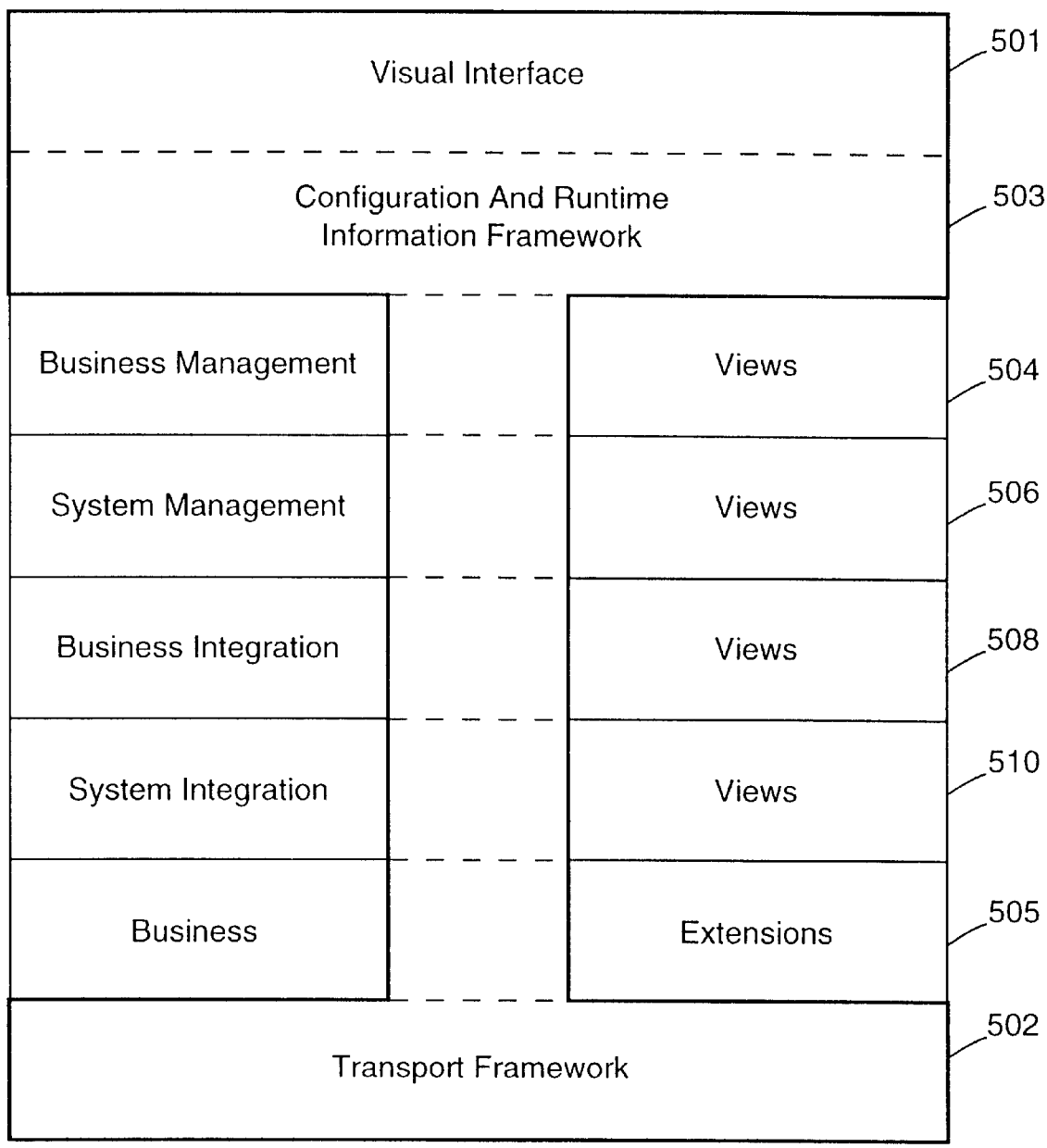
FIGS. 15 and 16 are conceptual models of a visual data integration architecture including a transport framework, visual interface, a configuration and runtime information framework, and one or more business extension modules implemented in accordance with an embodiment of the present invention.
Figure 16:
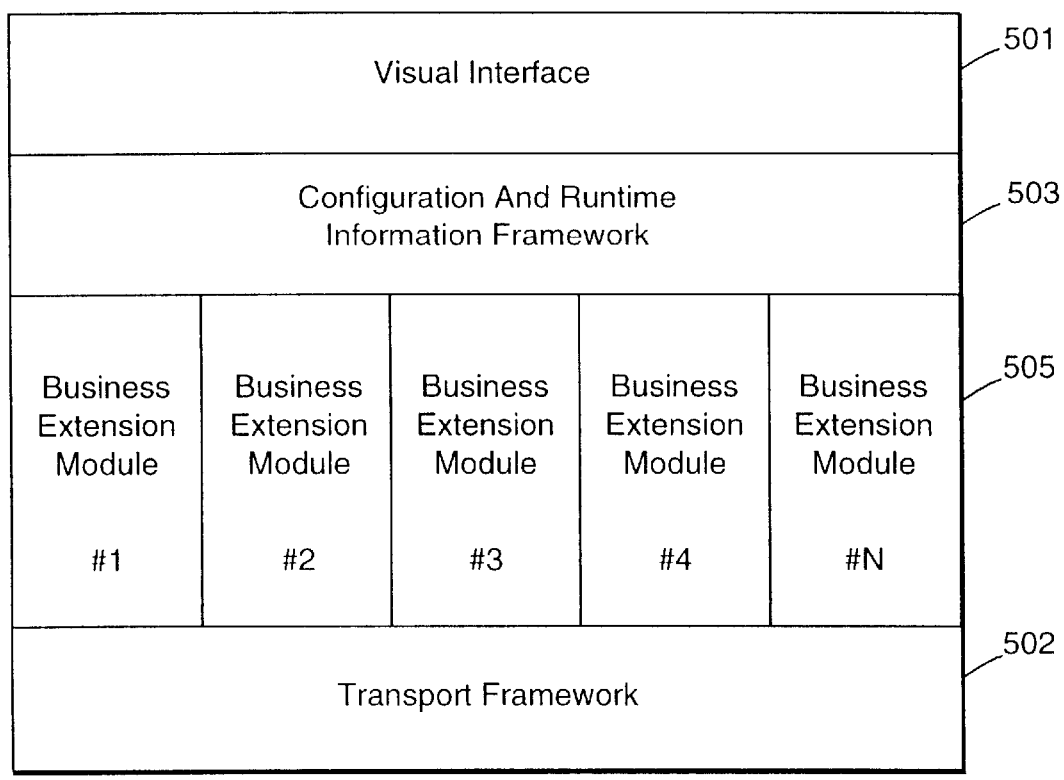

Having discussed hereinabove various embodiments of a data transport mechanism within the context of the present invention, a description of a visual interface implemented in accordance with the principles of the present invention will now be provided in greater detail. FIGS. 15 and 16 are conceptual models of a visual data integration architecture employing a transport framework 502, visual interface 501, configuration and runtime information framework 503, and one or more business extension modules 505 implemented in accordance with an embodiment of the present invention.

As was previously discussed, the transport framework 502 provides a technology-independent integration mechanism that enables reliable and scalable routing of information between dissimilar applications and technologies. The visual interface 501 enables the rapid design, deployment, and runtime control and analysis of the business and system aspects of an integrated information system implementation. An underlying configuration and runtime information framework 503 cooperatively operates with the visual interface 501 and transport framework 502 to effectively transform graphical interconnections established between system components using the visual interface 501 into logical or physical interconnections, which results in the contemporaneous generation of an integrated runtime system deployment.

The complexity of conventional integration approaches and the general inability to integrate available business and system integration tool sets greatly complicates the effort of providing and maintaining consistency in a integrated information system design. For example, existing data integration tools typically focus on horizontal technical aspects of system integration. Existing business tools typically focus on addressing horizontal business integration problems, such as meeting business needs using information derived from data maintained within the information system. A conventional approach to designing an integrated information system generally involves solving the technical/system integration problems prior to, and often with little regard to, addressing the business integration objectives. As such, business and system integration efforts often progress along separate development paths in a manner dictated by distinctly different design objectives. Vertical integration consistency, which is critical to a successful fully integrated solution, is generally impracticable if not impossible to achieve using a traditional system integration approach.

A visual integration system developed according to the present invention advantageously harmonizes the business and system integration/management requirements of a given business problem using a consistent data integration and system development methodology. The configuration and runtime information framework 503 and transport framework 501 of the present invention provide for consistent vertical and horizontal system and business integration. The visual interface 501 of the present invention provides for high-level modeling of an integrated information system, where both business and technical aspects of a system design may be conjointly represented, created, and controlled.

The business extensions 505 represent business functionality modules that may be used in the visual interface 501 to provide specific business integration capabilities. Business extension module #1, for example, may include a set of components that make available legacy applications through internet type technologies. The components of business extension module #1 enable easy creation of standardized Web browser interfaces for existing applications without changing or affecting the application. Multiple user interfaces may be readily created using the components of business extension module #1. The adapters associated with the components of business extension module #1 may include the following: screen scraper adapters (e.g., Telnet, HTTP/SHTTP, IBM 3270, VTXXX, and HP700/9X); Web adapters (e.g., CGI, HTML); file adapters (e.g., ASCII); mail/pager/fax adapters (e.g., SMTP, MIME, SMS); printer/fax adapters (e.g., LP, Printserver); script adapters (e.g., Shell, Perl, Batch); and JAVA adapters (e.g., JAVASCRIPT).

Business extension module #2, by way of further example, may include a set of components that provide full database interface capabilities. The adapters associated with the components of business extension module #2 may include the following: adapters certified with Oracle and SQL server; adapters for any ODBC; and adapters for X/Open.XA.

Business extension module #3 may include a set of components that add internalization capabilities to an application by enabling, through appropriate adapters, storage of data in the following internationalized character sets: UTF-8 to 7-bit ASCII conversions; UTF-8 to 8-bit ASCII conversions; UTF-8 to $16/32$-bit UNICODE conversions; and UTF-8 to 5-bit BAUDOT conversions. The adapters may provide for ITU compliance and international font support. The business extension module #2 may further provide a visual message catalog generator/editor capability.

Business extension module #4 may include a set of components that provide for the building of sophisticated network management interfaces. The components and adapters of business extension module #4 may, for example, provide TMN (Telecommunications Network Management) service management capabilities, such as managing service level agreements, providing interaction with service providers, and managing interactions between services. TMN business management capabilities may be provided, such as managing agreements between operators. Monitoring systems may be developed without altering existing applications for a number of purposes, including: verification of equivalent OSS access for local loop/long distance service providers; ensuring interface conformance to standards-based network management products (e.g., HP OpenView, ADC Metrica, and ADC INMG); identifying system bottlenecks; and verifying system-to-system equivalence and business process improvements. Other capabilities may include implementing visual alarm level setting tools and visual tuning interfaces.

Business extension module #5 may include a set of components that enables complete integration or componentization of any MICROSOFT WINDOWS system or interface. The components and adapters of business extension module #5 may provide for the following capabilities: conversion of single-user WINDOWS applications to multiple-user distributed applications; interfacing to WINDOWS applications via the Internet or any other protocol mechanism; and sophisticated automation of WINDOWS application interfaces, including logic controlled responses, dialog box control, heuristic adaptive agent interfacing, and ActiveX interfacing.

Business extension module #6 may include a set of components that provide for the development of electronic commerce (i.e., E-commerce) interfaces. The adapters associated with the components of business extension module #6 may include the following: EDI adapters for supporting various EDI dialects; and security control adapters that provide for user verification and access authorization, encrypted transactions, non-repudiation of completed transactions, and system and transaction access control.

Business extension module #7 may include a set of components that provide for the building of sophisticated business management interfaces. The components and adapters of business extension module #7 may provide for visual end-to-end system transaction representation and the development of visual billing system interfaces. A visual user-interface rules controller may be developed that provides for the following capabilities: definition and control of data routing and mapping; data meta-model building to provide for structural definition of complex objects and mapping to external systems; and data convergence/compounding. The components and adapters of business extension module #7 may also provide for the development of a visual audit log, including the capability to define data structures and components to be archived for audit purposes, and the development of an audit log reporter. Other capabilities may include development of data exchange common object converters and stub generators (e.g., ASNI, IDL, and GDMO).

Business extension module #8 may include a set of components and adapters that provide for the development of workflow interfaces, including standards-based workflow interfaces. Other capabilities may include support of various workflow and process management systems and visual multi-part rule control.

Business extension module #9 may include a set of components and adapters that enable complete integration or componentization of any system or interface. Business extension module #9 may represent a comprehensive toolkit that provides for the creation of data exchange adapters for easy integration with middleware systems. The platforms supported through use of the business extension module #9 components may include, for example, MICROSOFT Visual C++5.0 or higher, HP ANSI C++, and SUN C++ Workshop Compiler 4.2 or later. The comprehensive toolkit further enables integration with CORBA, DCOM, and TMN (CMIP, CMIS), and includes programming interface libraries with IPC for FORTRAN and COBOL. A common object file translator, common object packer source code, and adapter stub source code may also be included in the comprehensive toolkit of business extension module #9.

A set of deployment examples are typically included with each of the business extension modules. A typical deployment example steps a user through the design and deployment phases of a hypothetical system integration scenario as a tutorial or introduction to the features and capabilities of a particular business extension module.

The use of business extension modules in cooperation with the configuration and runtime information framework 503, visual interface 501, and transport framework 502 provide for a highly flexible, yet consistent, approach to implementing an integrated information system that meets both business and system integration requirements. Because there is no direct dependency between the frameworks 501, 503 and business extension components 505, an integrated information system may be developed and deployed using a transport framework 502 different from the data exchange infrastructure/adapter framework described in detail hereinabove. The absence of a direct dependency between the frameworks 501, 503 and business extension components 505 also provides for the development and deployment of an integrated information system without requiring use of the visual interface 501, such as by manually configuring the system.

In general, the visual interface 501 provides a visual framework within which all configuration, deployment, and runtime aspects of an integrated information system design or deployment may be accessed. The visual interface 501 provides a user the ability to graphically construct an information system and to effect physical connectivity between information storage, processing, and transmission components so as to graphically and physically implement an integrated information system.

Figure 17:
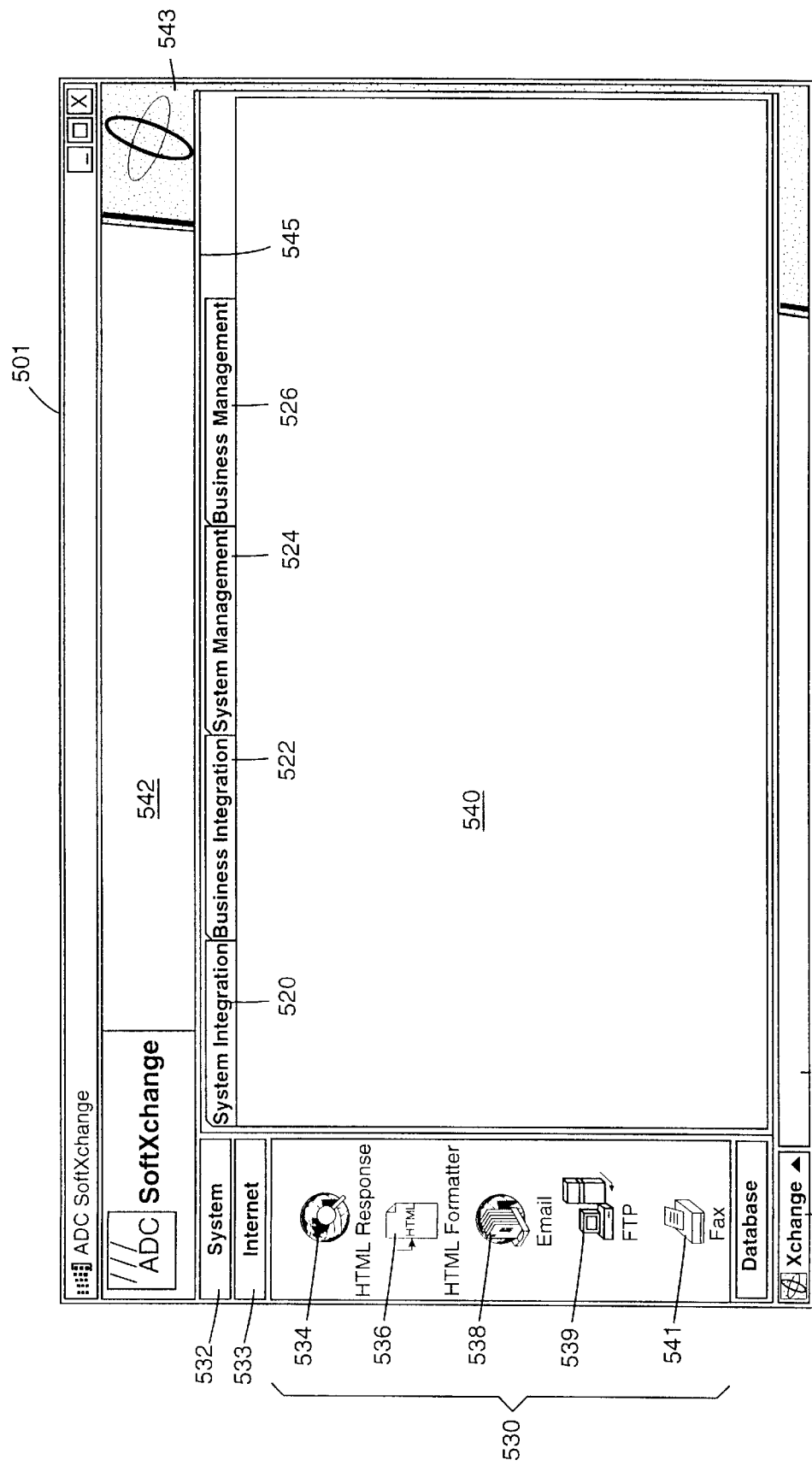
FIG. 17 is a depiction of a visual interface for constructing, deploying, monitoring, and managing a data integration deployment in accordance with an embodiment of the present invention.

In accordance with the embodiment depicted in FIG. 17, the visual interface 501 includes a canvas 540 which represents the main area of the visual interface 501 where data integration deployments are constructed and managed. A system selection button 532 provides a user the ability to select between various information system deployments or projects. A business extension selection button 533 provides for user selection of any of the various business extension modules 505 that are made available to the user.

Business extension modules purchased by a user are typically loaded into the system and automatically become available when appropriately selected using the business extension selection button 533. For example, the palette 530 shown in FIG. 17 includes the set of components/adapters which are part of business extension module #1 shown in FIG. 16. As discussed previously, these components/adapters provide access to legacy applications through use of internet type technologies. Selection of business extension module #1 by the user is indicated by the "internet" status of the business extension selection button 533.

Clicking on a selected business extension module using the selection button 533 results in displaying of the constituent components/adapters associated with the selected business extension module. Each of the components or adapters constituting a given business extension module is represented in icon/button form in the palette 530. In FIG. 17, for example, contents of the Legacy-to-Internet business extension module displayed in icon form in palette 530 include adapters for HTML Response 534, HTML Formatter 536, Email 538, FTP (File Transfer Protocol) 539, and Fax 542. The palette 530 is provided with a scroll bar to access adapters that are not presently displayed in the available space of the palette 530.

The upper area 542 of the visual interface 501 contains an animated logo 543 for the data integration tool. This logo 543 becomes animated when the system is running, thereby providing an easily perceivable indication as to the status of the system. The area 545 to the left of the logo 543 is available for tool bars as are deemed necessary or desired. A tool bar may be developed to provide a shortcut to desired primary menu items. Each button of a tool bar included within the upper area 545 generally provides pop-up tool tips associated with it.

In the bottom left corner of the visual interface 501 is an Xchange button 544. Activating the Xchange button 544 opens a pop-up menu of common system wide commands and configuration controls. A first group of menu buttons, which may be accessed via an appropriately configured tool bar or by activation of the Xchange button 544, may operate on project files, and include the following activatable buttons: new, open, save, delete, and print. A second group of buttons may include start, shutdown, pause and resume the system buttons, for example. Menu items may be disabled when their operation is not appropriate for a given context. The lower border 546 of the visual interface 501 is available for high-level status information and for help prompts that may be useful during configuration.

The canvas 540 of the visual interface 501 includes four tabs 520, 522, 524, 526 for activating four different available views of an information system layout. The four views activatable using tabs 520, 522, 524, 526 include System Integration, Business Integration, System Management, and Business Management views, respectively.

Figure 18:
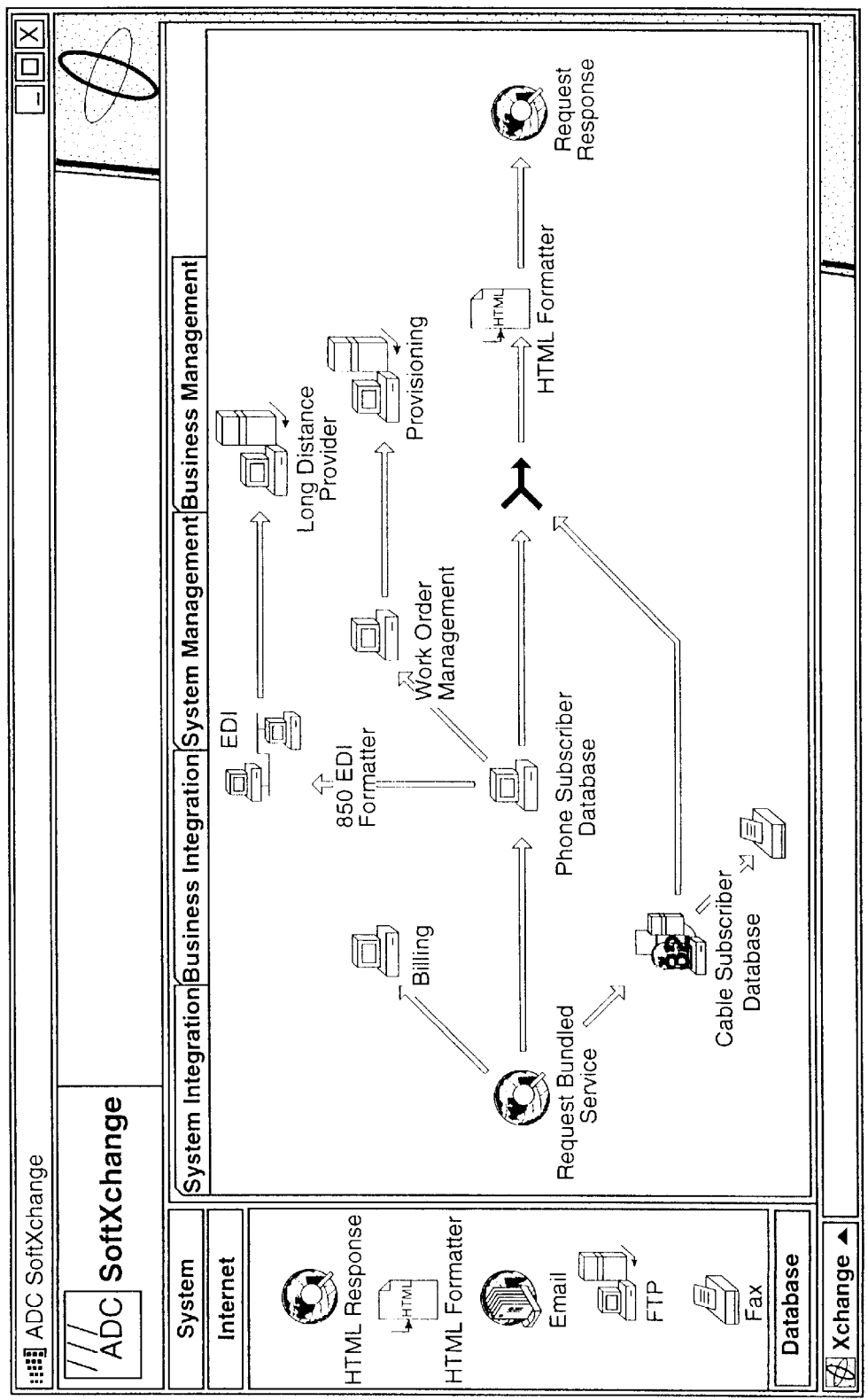
FIG. 18 is a graphical illustration of an actual data integration system implementation as seen using a System Integration view.
Figure 20:
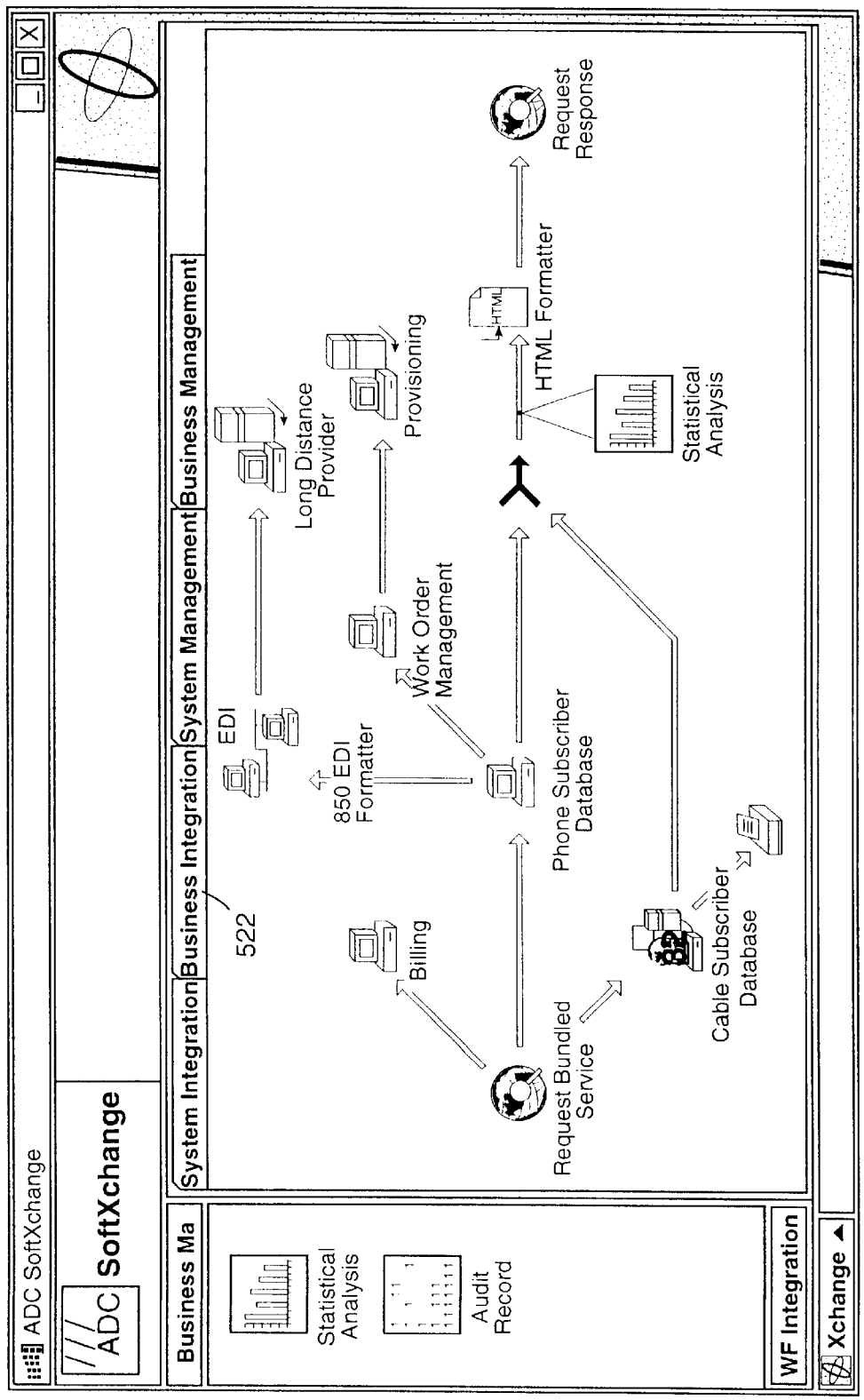
FIG. 20 is a graphical illustration of the data integration system implementation shown in FIG. 18 as seen using a Business Integration view.

The System Integration view, which may be activated using tab 520, provides the ability using drag-and-drop techniques to visually construct and configure a data integration implementation using a palette of stock integration adapters typically packaged as part of a business extension module. FIG. 18 illustrates a data integration implementation as seen using the System Integration view. The Business Integration view, which may be activated using tab 522, allows a data integration implementation to be customized with business analysis and auditing capabilities using business orientated adapters. FIG. 20 illustrates the data integration implementation of FIG. 18 as seen using the Business Integration view.

Figure 21:
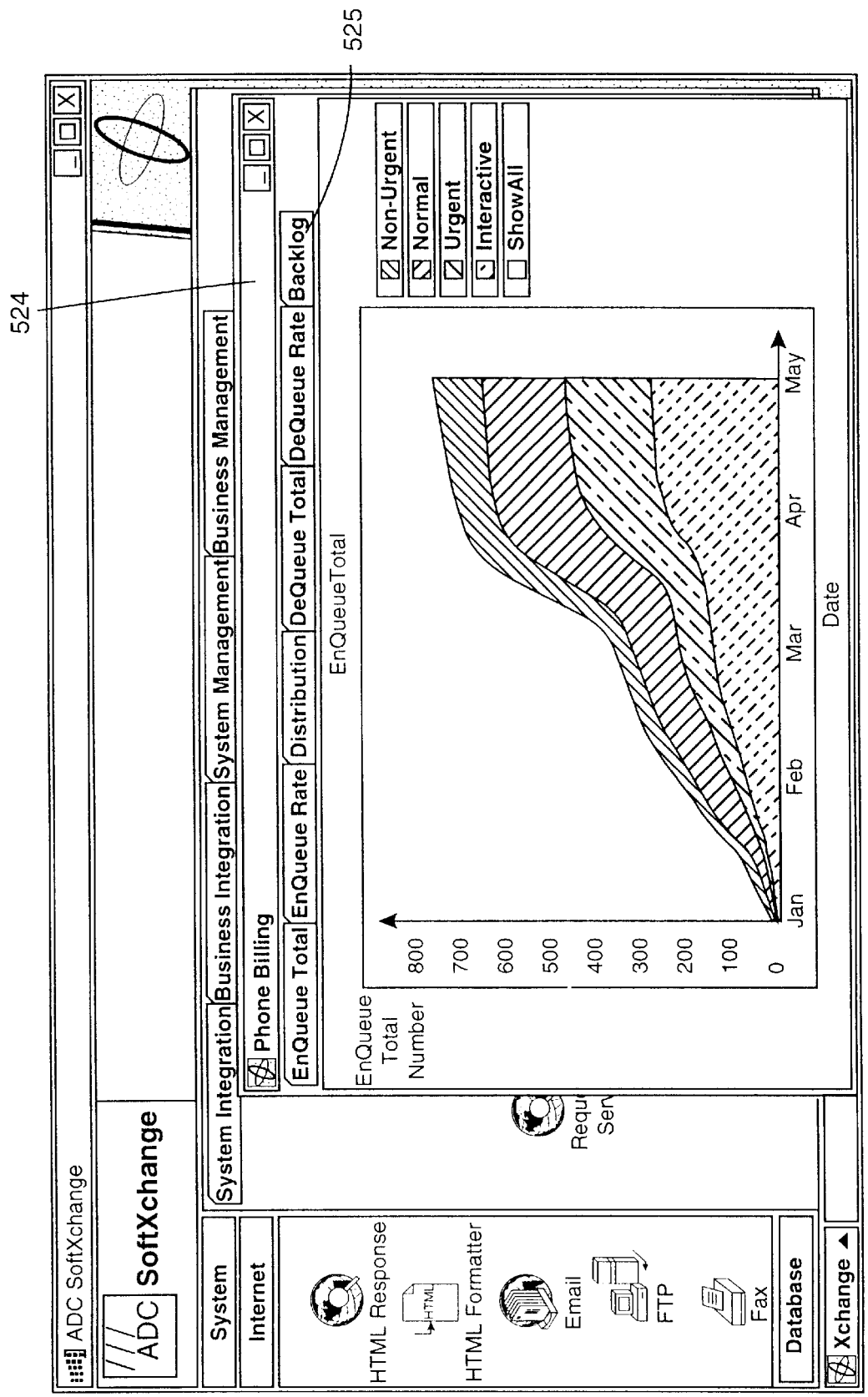
FIG. 21 is an illustration of a queue status chart developed from the data integration implementation shown in FIG. 18 using a System Management view.
Figure 22:
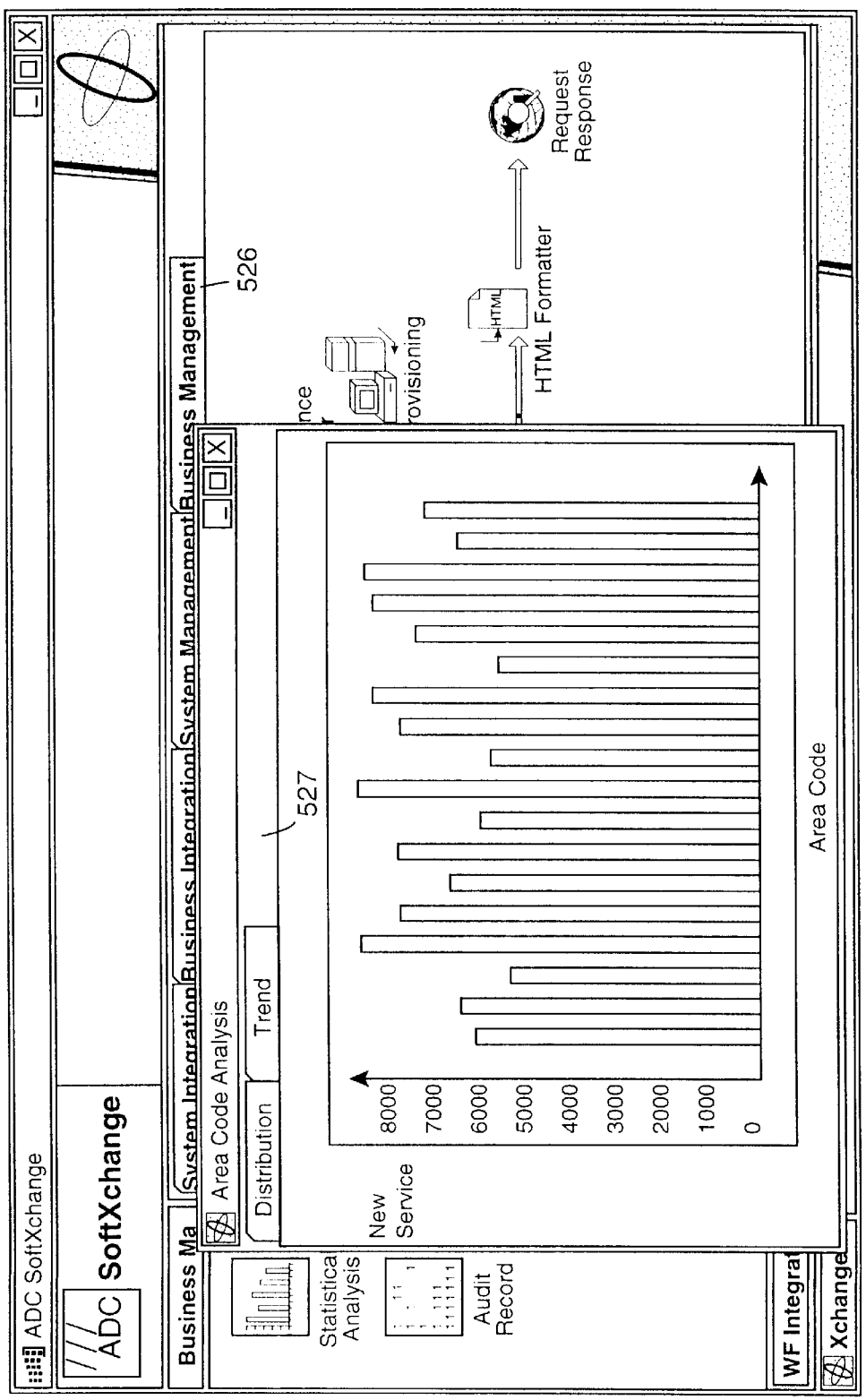
FIG. 22 is an illustration of a business information graph developed from the data integration implementation shown in FIG. 18 using a Business Management view.
Figure 25A:
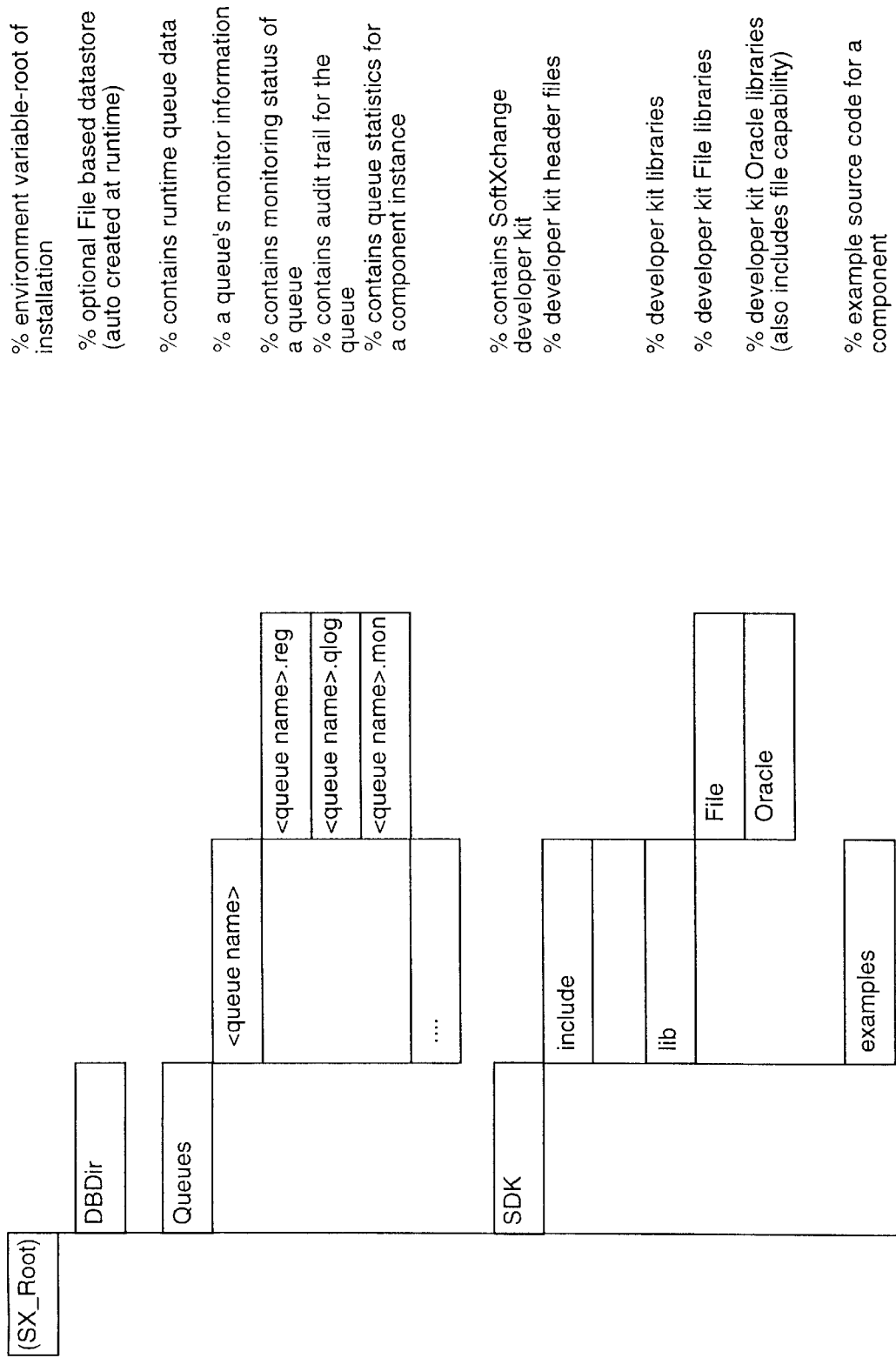
FIGS. 25A–25F define a directory structure of the configuration and runtime information framework of a visual data integration architecture within which configuration files are placed and manipulated in accordance with one embodiment of the present invention.
Figure 25B:
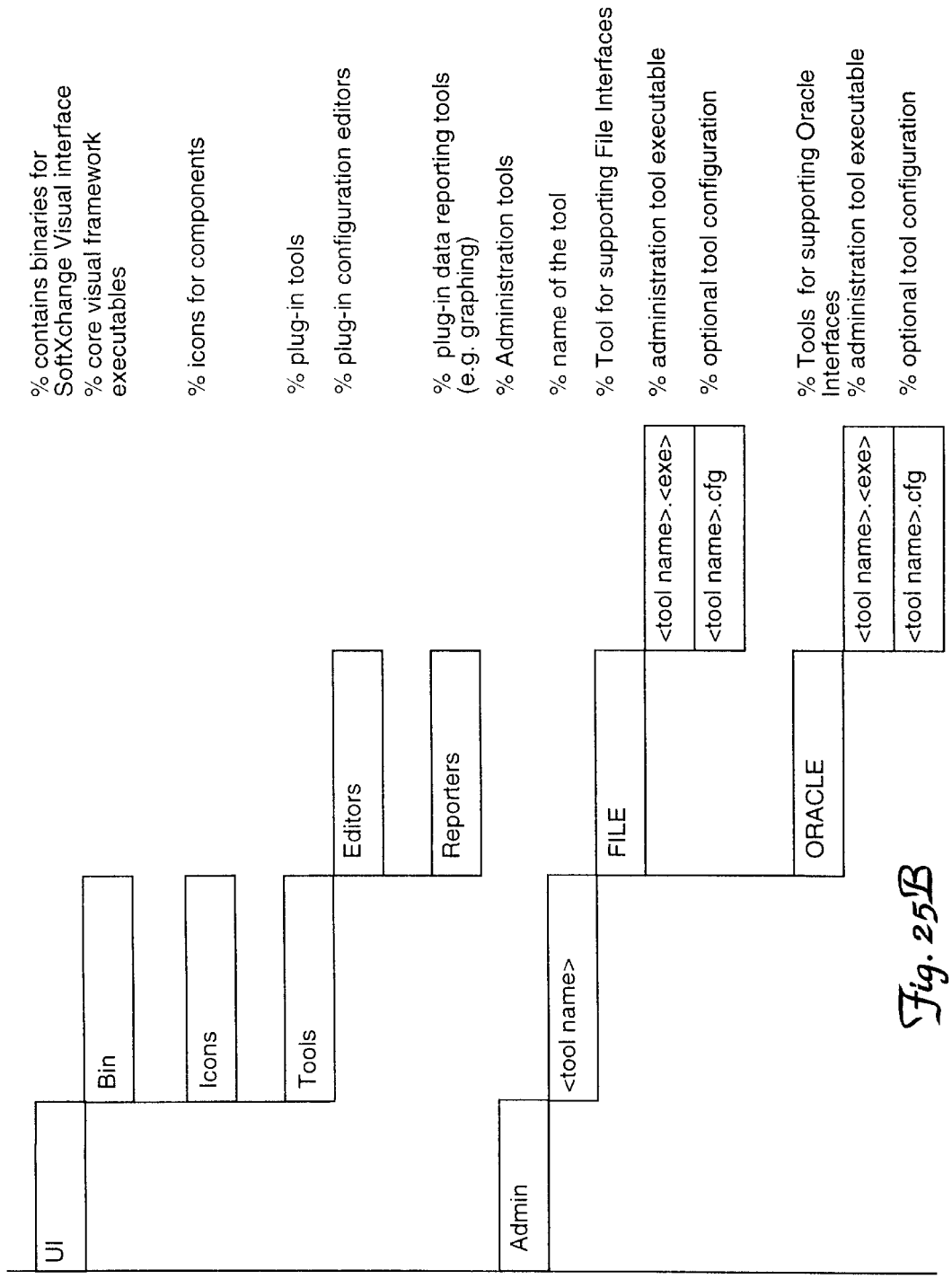
Figure 25C:
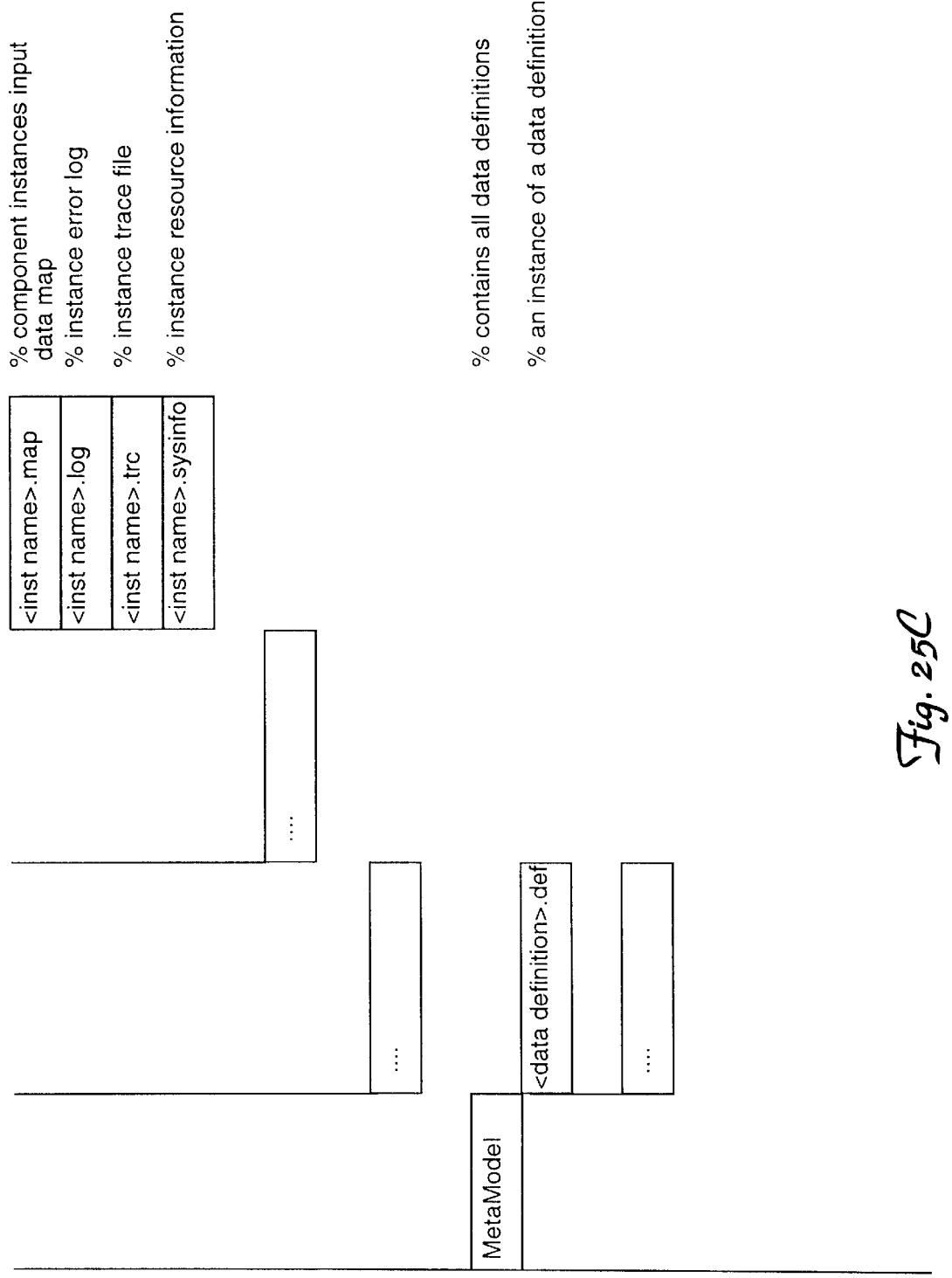
Figure 25D:
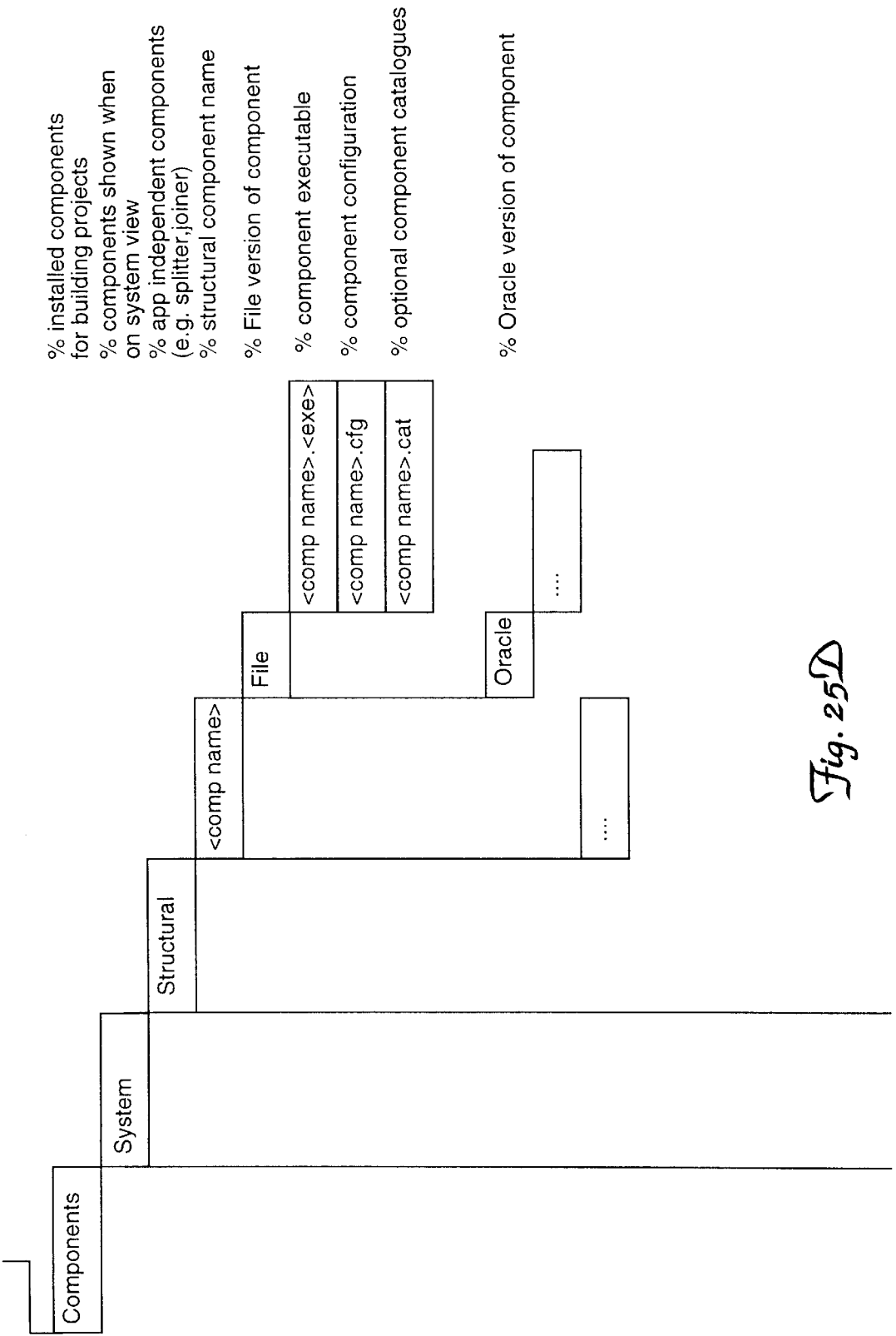
Figure 25E:
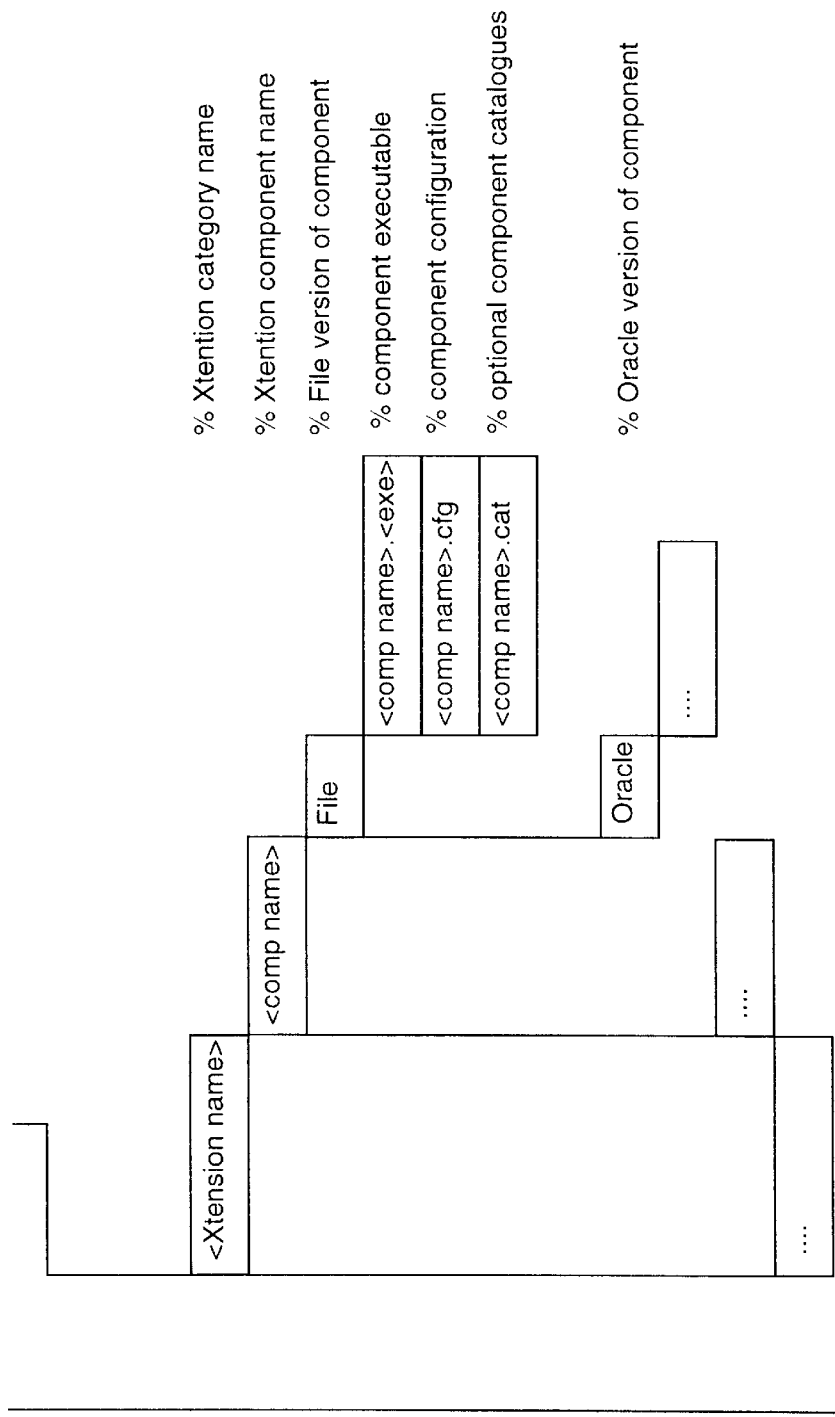
Figure 25F:
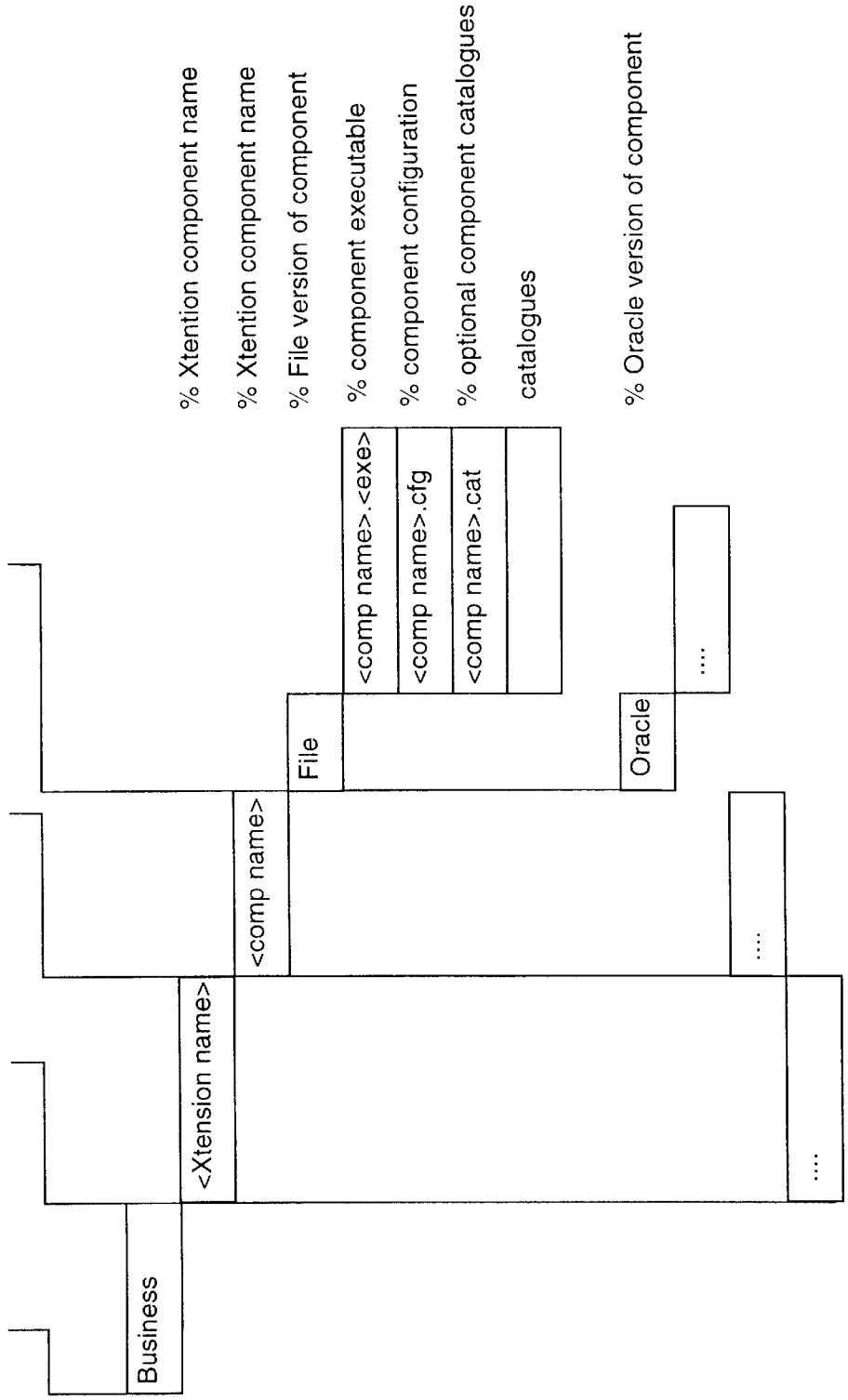

The System Management view, which may be activated using tab 524, provides a view onto the runtime status of a data integration implementation, allowing system throughput and bottlenecks to be examined and analyzed. The runtime environment of a data integration implementation may be examined and analyzed using visual charting and maintenance plug-in modules. FIG. 21 illustrates the data integration implementation of FIG. 18 as seen using the System Management view. The Business Management view, which is activated using tab 526, enables the business manager to analyze information trends and review audit logs derived from the data passing through the system using charting plug-in modules. FIG. 22 illustrates the data integration implementation of FIG. 18 as seen using the Business Management view.

Clicking on one of the tabs 520, 522, 524, 526 alters the information shown on the canvas 540 and the operations effected in the canvas 540 as appropriate for the selected view. For example, double clicking on an adapter in the System Integration view (e.g., see FIG. 18) results in displaying of an invoked configuration utility for the selected adapter. In contrast, selection of the same adapter when the System Management view (e.g., see FIG. 21) is active results in displaying of any runtime errors associated with the adapter. By providing different views within an integrated visual framework, vertical consistency of the system and business layers of the integrated data solution is maintained.

The functionality of the visual interface 501 is extensible through the use of plug-in administration and runtime components. A wide variety of plug-in components may be installed in the form of solution focused business extension modules or as independent elements. The plug-in components may also be used in a standalone mode outside of the data integration framework for purposes of solving individual user requirements. A particular user, for example, may only wish to view a specific chart, and running the full visual interface 501 to obtain a single chart may be unnecessarily burdensome. In such a case, the charting plug-in component may be decoupled from the visual interface 501 and placed in either a separate running applet or included as part of a personal web page, for example.

As is best depicted in FIGS. 15 and 16, the visual interface 501 may be viewed as constituting a thin veneer interface layer built over a well-defined configuration and runtime information framework 503. The configuration and runtime information framework 503 provides a level of indirection between the visual interface 501 and the underlying business extension modules 505 and transport framework 502 technology. By removing dependencies across these layers, this indirection provides for a significant degree of flexibility as to the manner in which the various components are implemented and interconnected in a given data integration solution.

The configuration and runtime information framework 503 controls the adapters that are available for use in a given data integration deployment. The framework 503 also controls the adapters that are configured as active adapters in a given deployment, along with their actual configuration. The structural layout of a data integration deployment, such as the particular queues being used to allow data to flow between selected adapters, is also controlled by the configuration and runtime information framework 503. The framework 503 is also used to control the definition of the meta-model being used by each adapter, and the mappings of meta-models between adapters. As was discussed previously, the data meta-models represent format neutral models of the input and output data requirements of the disparate systems of a data integration project. The use of data meta-models removes any cross-dependencies that exist between the various systems and technologies implicated in the data integration project, and permits the establishing and modifying of interconnections between system components using visual drag-and-drop and meta-model mapping metaphores.

When the visual interface 501 is being used in either the System Integration or Business Integration view mode, actions within the visual interface 501 result in corresponding adjustments to the various configuration settings. These configuration settings, in turn, are read by the applicable business extension modules 505 and transport framework 502 during runtime to specify how a particular deployment will operate.

During runtime, the business extension modules 505 and transport framework 502 also record in the configuration and runtime information framework 503 information or references to the information being transported through the integrated information system. For example, if the data exchange infrastructure 32 and adapters 34 shown in the embodiment of FIG. 1 constitute the transport framework 502 shown in FIGS. 15 and 16, then the transport information would be recorded in the queues and common object store of the data exchange framework.

Also recorded in the configuration and runtime information framework 503 are error logs, runtime performance and throughput information, and audited business data and information to be used for legal records or trend/statistical analysis. The exact nature of the information recorded in the configuration and runtime information framework 503 is typically controlled by the configuration settings. This information may then be viewed graphically by the various visual interface plug-in utilities and charting applications in either the System Management or Business Management views.

FIGS. 25A–25F define a directory structure of the configuration and runtime information framework 503 within which configuration files are placed and manipulated in accordance with one embodiment of the present invention. Examples #3–#5 provided hereinbelow provide the content of the various configuration files in accordance with this embodiment. The three primary types of configuration files are project files (see Example #3), component instance configuration files (see Example #4), and component configuration files (see Example #5). There is typically one project file associated with each data integration implementation. The project file contains the top-level definition of the adapters that are part of a data integration implementation and defines how the adapters are structurally connected together. Included in the project file are references to the component and component instance configuration files of a given deployment. The information in the project file is used by the visual interface 501 to render a picture of a data integration implementation on its canvas 540.

There is typically one component configuration file for each adapter that has been installed. It is noted that if a particular adapter is used more than once in a data integration project or in multiple projects, there is still only one component configuration file associated with the particular adapter. The component configuration file contains a definition of how the adapter participates in the data integration implementation. For example, the component configuration file contains information such as a definition of the integration capabilities of the adapter, e.g., the number of input queues read by the adapter and the number of output queues to which the adapter can write. Other information contained in the component configuration file includes the commands used to run, stop, and pause the adapter, the operations that should occur when a user double clicks on the adapter's icon in the various different views, and the default configuration of the adapter.

There is typically one component instance configuration file for each instance of an adapter used in a given data integration implementation. The instance configuration contains individual configuration settings for that instance of the adapter.

The component configuration files provide the capability for adapters to be fully defined as plug-in components into the visual interface 501 and transport framework 502. Neither the visual interface 501 nor the transport framework 502 need be implemented with full knowledge of all adapters that may possibly be developed in the future. Adapters, as and when they are created, may simply be installed into the existing directory and configuration structure in order to become useable components in a data integration project. This allows the data integration approach of the present invention to be highly extensible. Additionally, custom adapters may be developed so that they conform to the standard layout and configuration. Such custom adapters may then be used and reused in projects in the same manner as standard adapters. This is particularly significant as it is believed that few robust deployments can be completed without some degree of customization.

A centralized store of all project files is defined in the configuration and runtime information framework 503. When a new data integration project is being initiated, a default project file is created. A menu is typically presented to the user. An open menu item may be activated by the user to invoke a file selection dialog in order to load an existing project file. It is noted that only one data integration project can typically be open at a time. When a user switches to another project, a dialog will pop up to request whether the user would like to save any changes made to the current project. A delete menu item is enabled only when a project is selected. A print menu button is made available only when a project is displayed on the canvas 540 of the visual interface 501.

As was discussed previously with respect to FIG. 17, the layout of a data integration project is defined within the canvas 540 of the visual interface 501. The System Integration and Business Integration views are primarily used for data integration layout. The palette 530 is populated with appropriate business extension modules and associated adapters when each of these views are activated. When using the System Integration view, the components populating the palette 503 represent adapters of a technical nature that are used to integrate the technologies and protocols of the various system elements. When using the Business Integration view, the components populating the palette 503 represent adapters directed to the auditing, processing, and analysis of business information. The adapters and components made available to the user are determined by the visual interface 501 while examining the contents of the components directory (see, e.g., FIGS. 25A–25F).

In typical use, the user designs a data integration layout when the System Integration view is active by selecting various adapters and components displayed in the palette 530 of the visual interface 501. This is achieved by dragging selected adapters from the palette 530 and dropping them onto the canvas 540 using a mouse or other input device. This operation results in the creation of a new entry for the selected adapter in the project file and, additionally, results in the creation of an instance configuration file in the projects directory using a copy of the default configuration derived from the component configuration file.

After two or more adapters or components have been moved to the canvas 540, selected adapters/components may be linked together by drawing the mouse with key depressed from the source adapter to the destination adapter. The component configuration files associated with the source and destination adapters are checked to ensure that this new connection will be valid and will not exceed the maximum number of outputs of the source adapter or the maximum number of inputs of the destination adapter. Assuming that the new connection is valid, an arrow is drawn connecting the two adapters. A unique queue name is created for the connection, and the instance configuration files for the project and two adapters are updated to include the name of the newly created queue.

By connecting two or more adapters together with a queue, a communication channel is created between the adapters. However, in order for the connection to be valid, it is additionally important to confirm whether the information passed through the queue is understood at the destination to ensure that the source and destination adapters are effectively communicating. Confirming the integrity of the communication channel established between two adapters is accomplished by comparing the meta-data models of the source and destination adapters and determining whether the models are compatible. As will be described later in greater detail, an adapter has associated with it a defined input and output meta-data model which indicates the data that the adapter is expecting to receive and dispatch. By comparing the meta-data models of two connected adapters, it is possible to determine whether the two meta-data models are compatible. If the two meta-data models are determined to be incompatible, the two adapters in question are visually marked in the canvas 540 to indicate the presence of a configuration error, such as by the use of an "X" or other warning indicia.

In order to rectify a configuration error, a user may double click on the implicated adapters in either the System or Business Integration views in order to display configuration screens associated with each of the adapters. The actions carried out, and the application launched, as a result of a double click are defined in the component configuration file for each of the four views. If no custom configuration application or applet exists for a particular adapter, a default configuration applet will be launched. The user may alter an adapter's defined meta-model using the configuration screens associated with the adapter. For example, the meta-model of an ODBC adapter may be modified by changing the SQL statement of the adapter so as to alter the data needed for an SQL query, thereby changing the results generated by the SQL query.

By configuring adapters in this manner, incompatibilities existing or arising between two or more interconnected adapters may be rectified. If, for example, incompatibilities are caused simply because different labels are used for the same data field for two interconnected adapters, then a visual mapping tool may be launched to define the mapping between the two labels to address this problem.

The default configuration application may also be used to change adapter/component icon labels. An icon has a separate label for Business views and System views to allow appropriate explanations to be displayed for different users. The configuration application may be used to modify adapter labels, as well as various standard and custom adapter configuration parameters.

After the meta-data model issues have been resolved, a valid data integration link is created between the two adapters. By repeating the above-described design process with multiple adapters, a complex multiple component data integration implementation may be constructed. After all adapter instances have been created, all necessary links have been established, and all configuration errors have been resolved, the integrated information system is ready for runtime operation.

The System Management and Business Management views, respectively shown in FIGS. 21 and 22, are typically used to control the runtime operation of a data integration project. The transport framework 502 gathers throughput information on the various queues which may be displayed in a charting application by double clicking on a selected queue while in the System Management view. The contents of a specific queue may be managed by right clicking on a queue and selecting Queue Management from the menu. Double clicking on a selected adapter while in the System Management view displays the configuration screen for the adapter. Adjustments to the configuration settings of a selected adapter are saved by the configuration application or applet to the appropriate instance configuration file, and these configuration settings are adjusted during runtime in response to a configuration reset signal received by the selected adapter.

The Business Management view is used primarily to chart statistical analyses carried out by the business extension modules. Double clicking on a component, such as a Business Analysis component, results in displaying of the charts of information trends and distributions associated with the Business Analysis component.

Figure 19:
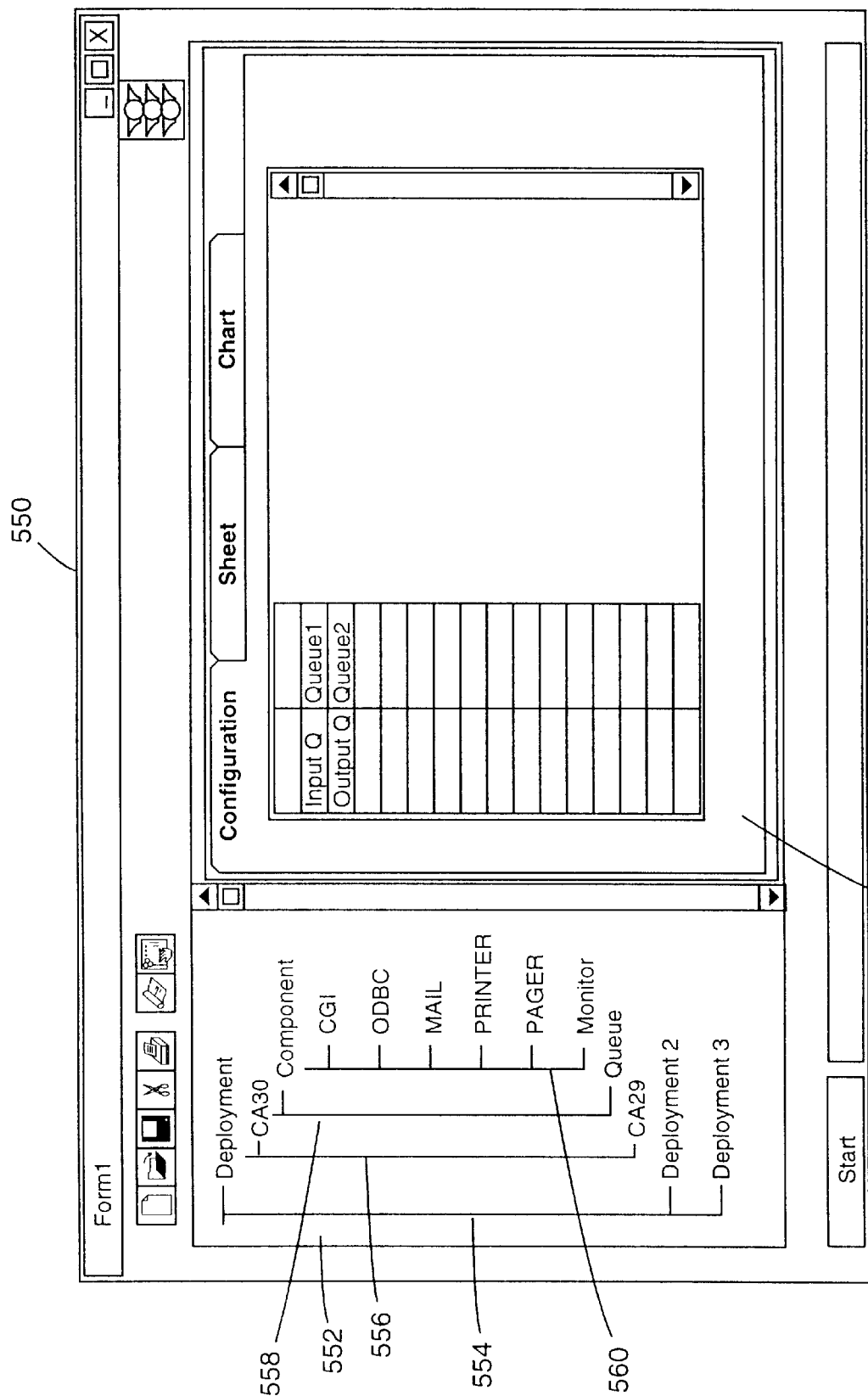
FIG. 19 is a depiction of a distribution planning panel of a visual interface of the present invention that provides a tree view of the network environment currently in operation for a selected data integration project.

The integration of data across multiple platforms and multiple workstations is coordinated through the use of a distribution planning facility. Activating the Xchange button 544 results in the presentation of a menu item which permits the user to invoke a distribution planning panel. The distribution planning panel 550, an embodiment of which is shown in FIG. 19, includes a panel 552 that provides a tree view of the network environment currently in operation for a selected data integration project. Each node in the first level 554 of the tree represents the name of a project. The second level nodes 556 under the project nodes 554 indicate the names of the workstations on which specified components are operating. A third level of nodes 558 indicates the various components operating on a particular workstation. A fourth level of nodes 560 indicates details of either component or queue elements defined on the third level of nodes 558. For example, the components shown in panel 552 of FIG. 19 includes six individual adapters, namely, CGI, ODBC, Mail, Printer, Pager, and Monitor adapters. The Monitor adapter represents a monitoring process node that is typically distinguished from other adapter nodes in terms of color or font. It is noted that the network file system mapping used to access remote machines is typically set by a system administrator outside of the visual interface environment.

The distribution planning panel 550 retrieves and stores information from the project file. The canvas 540 of the main visual interface panel 501 also uses the project file. In this regard, the distribution planning panel 550 and canvas 540 of the main visual interface panel 501 represent the same deployment from two different perspectives. The distribution planning panel 550 is used from the global navigation point of view, while the canvas 540 of the main visual interface panel 501 is used from the data flow point of view.

The right portion of the distribution planning panel 550 includes a property sheet 562 which is used to show the data associated with a selected item. More specifically, the property sheet 562 presents configuration data, error/alert log information, and a performance data graph for a selected component process or monitoring process. For example, the property sheet of a selected queue shows various queue properties, including queue contents in a table format and queue monitoring data in a graphical format. Certain data, such as error/alert logs, performance data graphs, queue views, and queue monitoring data, presented in the property sheets 562 are read-only displays. The operations a user may perform using the property sheet 562 include, for example, deleting a queue entry from a queue, flushing a queue, changing the configuration for a component, and changing the configuration for queue monitoring.

The information reporting and charting functional area of the distribution planning panel 550 provides the capability for users to easily view and analyze the substantial amount of technical and business data collected by the system. A charting module is implemented to read the performance monitor log files and generates basic system management queue charts. The charting module also reads the statistic report files and generates basic business management statistic charts. The charting module is able to perform a number of other tasks, including displaying charts, taking snapshots of the report files periodically, and updating the charts dynamically. The time interval for chart updating is configurable. Before a chart is displayed, a configuration form is popped up to permit the input of various configurable parameters by the user, such as parameters associated with chart ranges and frequency of measurements. A chart is generated using the user configurable parameters.

Each adapter process has one set of log files generated for purposes of performance monitoring. The performance monitor log files for the adapter processes are stored in a predefined directory, such as that depicted in FIGS. 25A–25F. The data stored in each performance monitor log file that permits charting to be accomplished includes the following: time stamp, number of data items enqueued in a time interval by priority, number of data items dequeued in a time interval by priority, average message process time in a time interval by priority, and average message cache time in a time interval by priority data. The performance monitor log files are generated by adapters when a monitor flag is ON.

The data used to produce a statistics report based on business information include time stamp data and data regarding the list of attribute value and occurrence number pair in a time interval. A statistics report, such as that shown in FIG. 22, is generated using a business statistics adapter. The report is typically attribute based. The report time interval is configured in the business statistics adapter. All statistics reports are stored in the a predefined directory, such as that depicted in FIGS. 25A–25F.

The charts are typically user configurable. During a charting operation, a chart configuration form is presented to the user. For queue charts, the configurable parameters include the display period, although preset periods are available for simplifying the chart configuration procedure. For business statistic charts, the configurable parameters include attribute name, attribute value list, and display period. It is noted that the value of the configuration parameters is passed into the chart generation function. In one embodiment, the charts are generated using JAVA AWT 1.1 and JFC 1.1.

A chart is typically displayed in a frame window, which may be resized with the use of horizontal scrollbars. A tabbed pane is used to display the many different sub-panes, each with its own file folder-style tab. Each sub-pane represents one type of chart. The sub-pane can be repainted. The chart is typically displayed in color. The color legend is displayed at the right side of the panel. If the chart is updated dynamically, the time stamp for the chart is displayed in the upper left corner of the panel. A refresh button may be provided to refresh the chart on demand.

When the visual interface 501 is in the System Management view mode, double clicking on a queue link will create the charting application in a separate thread. A configuration form is popped up requesting a display period from the user. When the "OK" button in the configuration form is pressed, the configuration form disappears and the chart window pops up. The menu selections for the system related charts, as is shown in menu 525 of FIG. 21, include EnQueue Total, EnQueue Rate, Distribution, DeQueue Total, DeQueue Rate, and Backlog. The default chart is the EnQueue Total chart, an example of which is presented in FIG. 21.

When the visual interface 501 is in the Business Management view mode, double clicking on a statistical analysis adapter will create the charting application in a separate thread. A configuration form is popped up requesting the user for a display period, attribute name, and value list. When the "OK" button in the configuration form is pressed, the configuration form disappears and the chart window pops up. The menu selections for the business related charts, as is shown in menu 527 of FIG. 22, include Trend and Distribution. The default chart is Trend.

The charting application may be developed as a JAVA class, an example of which is defined as follows:

EXAMPLE #1

```
public class DX_Graph extends Thread {
    public DX_Graph(char *Qname, int viewId) {
        this.viewId = viewId;
        this.Qname = Qname;
    }
    public void run() {
        switch (viewId) {
            case SystemManagementView:
                DrawSystemManagementViewWindow();
            case BusinessManagementView:
                DrawBusinessManagementView();
            default:
        }
    }
}
```

-continued

```
public void DrawSystemManagementViewWindow() {
    Construct the configuration form
    Construct the tabbed pane with tabs:
        "Incoming", "Incoming Rate", "Outgoing", "Out Rate",
        "Backlog", the default subpane is "Incoming".
    The sub panes are:
        DrawEnqGraph(Qname, displayPeriod)
        DrawDeQGraph(Qname, displayPeriod)
        DrawBackLog(Qname, displayPeriod)
        . . .
}
public void DrawBusinessManagementViewWindow() {
    Construct the configuration form
    Construct the tabbed pane with tabs:
        "Trend", "Distribution", the default subpane is
        "Trend"
    The sub panes are:
        DrawTrendGraph(attrName, displayPeriod)
        DrawDistributionGraph(attrName, displayPeriod, char
                                                  valueList[])
        . . .
    }
}
```

The chart related calculations and display operations implicated in Example #1 above are accomplished as follows. DrawEnQGraph searches all of the performance monitor reports of the queue in the monitor log directory, reads each file, searches the time stamp column and enQMsgNum column, performs summation on the enQMsgNum column, and saves the time string and the enQMsgNum in a two-dimensional array in memory. The graph is generated from the two-dimensional array data.

DrawDeQGraph searches all of the performance monitor reports of the queue in the monitor log directory, reads each file, searches the time stamp column and processedMsgNum column, performs summation on the processedMsgNum column, and saves the time string and the processedMsgNum in a two-dimensional array in memory. The graph is generated from the two-dimensional array data.

EGetQBackLog searches all of the performance monitor reports of the queue in the monitor log directory, reads each file, searches the time stamp column and cachedMsgNum column, performs summation on the cachedMsgNum column, and saves the time string and the cachedMsgNum in a two-dimensional array in memory. The graph is generated from the two-dimensional array data.

EgetQPerformance searches all of the performance monitor reports of the queue in the monitor log directory, reads each file, searches the time stamp column and msgProcessNum column, performs summation on the msgProcessNum column, and saves the time string and the msgProcessNum in a two-dimensional array in memory. The graph is generated from the two-dimensional array data.

EgetSpaceUsage reads in any of the system information reports of the queue in the monitor log directory, searches the time stamp column, and saves the data entries falling within the specified time period in a two-dimensional array in memory. The graph is generated from the two-dimensional array data.

EgetIncomingRate searches all of the performance monitor reports of the queue in the monitor log directory, reads each file, searches the time stamp column and enQMsgNum column, performs a rate calculation on the enQMsgNum column, and saves the time string and the enQMsgNum rate in a two-dimensional array in memory. The graph is generated from the two-dimensional array data.

EoutgoingRate searches all of the performance monitor reports of the queue in the monitor log directory, reads each file, searches the time stamp column and processedMsgNum column, performs a rate calculation on the processedMsgNum column, and saves the time string and the processedMsgNum rate in a two-dimensional array in memory. The graph is generated from the two-dimensional array data.

The Trend function performs the following operations: reading the statistics report, applying a filter, and generating the graph. The statistics report provides time stamp, attribute name, and number of occurrence data. The Distribution function performs the following operations: reading the statistics report, applying a filter, and generating the graph. The statistics report provides time stamp, attribute name, and number of occurrence data.

For purposes of system management, access to the contents of queues is made available to the user. When viewing a queue, the records contained within the different priorities of a queue are displayed, as is shown in FIGS. 23 and 24. Priority based queuing is provided so that requests of high importance can be serviced quickly. Multiple queues are used to provide this level of functionality, but the implementation is logically transparent to the user. A user perceives that there is only one logic queue with objects of different priority in it.

The file storage or database tables for the queue are created at running time and deleted by the queue administration process. There are four types of pre-defined queue priority: NONURGENT; NORMAL; URGENT; and INTERACTIVE in order of increasing priority. INTERACTIVE is the highest priority, which can block any request having other priorities. The priority algorithm ensures that the DeQueue operation always returns successfully when the queue is not empty, prevents starvation of lower priority entries, and ensures more frequent visits on higher priority queues. The priority algorithm is implemented on a weighted basis of each priority.

The operations available from the dialog associated with queue displays shown in FIGS. 23 and 24 include deleting an entry from a queue, moving an entry from one queue to another, and displaying the contents of an entry, such as the queued common object shown in FIG. 24. The queue management utility, including the queue view displays shown in FIGS. 23 and 24, permits the user to adjust, correct, or otherwise modify the contents of a common object.

Configuring the visual data integration system according to the present invention is facilitated through employment of a configuration application. A default configuration application is made available to create configuration dialogs to get and set the configuration for adapters and components. This default configuration application is used when a custom dialog for an adapter is not available.

The configuration application reads in a configuration file and dynamically constructs a configuration form based on an SMI file. The configuration form is constructed in a generic two column form. The left column of the configuration form is used for displaying parameter name labels. The right column is used for displaying the parameter value. The parameter value is pre-loaded with a default value or the current value if present. The mechanism used to edit the parameter is selectable from a range of existing radio buttons, drop down lists, and edit boxes as defined by the SMI file.

For each workstation participating in a data integration project, there must generally be a monitoring process running as daemon thereon on a continuous basis. This monitoring process should be able to monitor all the component processes running or that should be running on the workstation for the given project. The monitoring process should read the project file to determine all component processes that should be running on the workstation, and how to run the process, such as on a daily, weekly or monthly basis for example. Each component process running on the workstation registers itself with the monitoring process. It is desirable that the monitoring process be able to start and shutdown any process instance at the request of a user.

The monitoring process is typically a multi-threaded process. One thread is implemented to monitor all the adapter processes registered with it. Another thread is implemented to listen to requests coming from, for example, JAVA GUI (Graphical User Interface). One implementation involves sending the requests via a system administration queue. Alternatively, communication may be effected through use of a sockets type protocol. If this approach is taken in accordance with one embodiment, the process must understand both JAVA and C++. One approach to implementing such a process involves using either JNI (JAVA Native Interface), which can integrate C++ native code into JAVA, or the use of UDP (User Datagram Protocol) sockets.

For distribution purposes, the socket solution is preferred. In accordance with this approach, when a project is opened in the JAVA GUI at run time, the JAVA GUI establishes a UDP socket accessible to all the monitoring processes across all workstations of a given data integration project. The JAVA GUI then controls each of the components via the monitoring process layer.

As was discussed previously, a meta-model approach is used to provide a system wide specification of object and contained attribute definitions that can be used to illustrate object layout, instantiate objects, and provide for translation from one meta-defined class to another. Each adapter accepts data in a specific defined meta-model definition, manipulates the data, and produces output data in a new meta-model definition. By comparing the input and output meta-models of two interconnected adapters, it is possible to determine whether the data exchanged between the adapters is valid. Minor inconsistencies in the data requirements of two communicating adapters may be adjusted by defining mappings between the two data meta-models. Severe incompatibilities between meta-model definitions are indicative of more fundamental data issues that may require some degree of redesign to correct. The use of a meta-model approach allows the validity of a data integration implementation to be verified, errors to be highlighted, and problems to be corrected.

Storage of the meta-model is typically implemented using a file based approach which advantageously removes any dependency on a particular database technology. Each object definition is contained in a separate file in order to isolate its definition and eliminate confusion between multiple object definitions. Each meta defined class is stored in a separate file which is named using a class plus some extension convention. The contents should be displayed in as flat a structure as possible. Each attribute consists of a single line which includes its name, type, and behavioral characteristics. Each line representing an attribute may conform to the following layout:

NAME|DX_DATATYPE|REQUIREMENT|RANGE
       (optional)|DefaultValue (optional)

By way of further example, a sample configuration for an object class named Customer is provided below:

CustomerName|DX_STRING|MANDATORY|256|
    Bank|DX_STRING|MANDATORY|256|"Rich's Bank"
    AccountNumber|DX_INTEGER|MANDATORY|0-9999999|
    Balance|DX_REAL|OPTIONAL||0

The following example is provided using the object class Customer defined above:

```
CustomerName|DX_STRING|MANDATORY||
AccountList|DX_LISTOBJECT|MANDATORY||
BEGIN:
    CheckingAcct|DX_COMMONOBJECT|OPTIONAL||
    BEGIN:
        AccountNumber|DX_INTEGER|MANDATORY|0-9999999|
        Balance|DX_REAL|OPTIONAL||0
    END:
    SavingsAcct|DX_COMMONOBJECT|OPTIONAL||
    BEGIN:
        AccountNumber|DX_INTEGER|MANDATORY|0-9999999|
        Balance|DX_REAL|OPTIONAL||0
    END:
    MoneyMktAcct|DX_COMMONOBJECT|OPTIONAL||
    BEGIN:
        AccountNumber|DX_INTEGER|MANDATORY|0-9999999|
        Balance|DX_REAL|OPTIONAL||0
    END:
END:
```

Any two meta defined objects can map attribute values from one object to the other as long as the DATATYPE is the same. For example, object class Customer has an attribute named CustomerName, while object class Lawsuit has an attribute named Defendant. Each time the application receives a Customer object, it attempts to create a Lawsuit object and take the value of CustomerName from the Customer object and insert it into the Lawsuit's attribute named Defendant.

In order to provide further granularity to the mapping, each adapter may retain a copy of its own specific mappings. This allows for different types of adapters to map the same objects in a different manner based on their own specific need. By way of example, a mapping file named Customer-Lawsuit.map is created and contains an entry in the form of the following example:

Customer.CustomerName=Lawsuit.Defendant

Customer.AccountList.CheckingAcct.AccountNumber= Lawsuit.DefaultAcct If this approach is determined to be too burdensome, a global mapping directory may be maintained.

If a standardized flat structure and format for all object data is employed, a set of general-purpose utility functions for inserting and extracting object/attribute values to and from a parameterized data stream based on an object's meta definition may be provided. This permits adapter developers to rely on a single way of passing the data so that an object is instantiated based on the meta-model.

In accordance with an embodiment of the present invention, the following methods are described involving meta defined objects for purposes of illustration. DX_CommentObject* StreamToObject(char* data) is a method that accepts tokenized values from an internal tokenized data stream format and produces a DX_CommonObject* corresponding to the meta definition that matches the data fields of the tokenized data stream. During instantiation, field and value validation is performed based on the meta definition. Given a DX_CommonObject, the method char* ObjectToStream (DX_CommonObject& Obj) flattens the object's attributes and values into an internal tokenized data stream.

The method DX_CommonObject* MapObjects(DX_CommonObject& srcObj), given a DX_CommonObject, instantiates and returns a new DX_CommonObject with the values automatically populated using the conditions specified in the mapping file. This method is automatically invoked by the Dequeue operation. This method also invokes a ValidateObject() method to ensure that the mapped input objects meets all of the specified criteria. The method EreturnCodes ValidateObject(DX_CommonObject& srcObj) is automatically invoked by the Enqueue operation to verify that the object being enqueued matches the meta definition for the object.

Various meta-model conversion utilities may be implemented for use with the more commonly used object models. For example, a JAVA applet that performs the lexical mapping may be integrated into the visual interface. A set of useful conversion utilities should be able to convert the following modeling standards into the meta-model employed in the visual data integration architecture of the present invention: GDMO (Guidelines for Designing Managed Objects), ASN.1 (Abstract Syntax Notation version 1), IDL (Interface Definition Language), and UML (Unified Modeling Language).

Each time an adapter is deployed, a set of meta definition files is supplied that corresponds to the specific functionality of the adapter. This allows new adapters to be easily added to the system without requiring the user to manually add these meta definitions. The meta definitions define one or more input objects, one or more output objects and, optionally, provide an internal definition of the operation that is performed when a specific input object is received. It is noted that if a modifiable internal operations definition is provided, the storage, editing, retrieval, and internal field mappings must be supplied by the adapter developer. For example, a database adapter may specify the following objects in the meta format:

EXAMPLE #2

GetEmployeeId (input object)
EmployeeName|DX_STRING|MANDATORY|256|
RequestOperation (Optional modifiable internal SQL operation supplied by the adapter developer)
GetEmployeeId="Select<EmployeeId>from Employees where EmployeeName=<EmployeeName>"
GetEmployeeIdResponse (output object)
EmployeeId|DX_INTEGER|MANDATORY|0-9999999|

As was discussed previously, and as shown in FIG. 18, when a data integration project is configured using the visual interface 501, a user typically selects at minimum two adapters, and then connects them with a line which represents a queue. When the line connects the two adapters, the user interface 501 performs a lookup to the meta-model(s) for each of the adapters and then compares them. If the models are inconsistent, the color or other visually perceivable characteristic of the interconnecting line is changed to alert the user that the two models cannot "plug and play" without performing some degree of custom mapping.

When a user wishes to perform mapping, the visual interface 501 provides two levels of mapping. Initially, a side-by-side view of the adapter meta classes is provided to allow the user to connect the two definitions with a line. Once the definitions are connected, the visual interface 501 presents a new side-by-side graphical view of the detailed meta definitions in an abstracted, but simple, object model view that can show containment. From this view, the user can then connect lines between the attributes of the two meta definitions. When the user is finished mapping the attributes and selects the "OK" button, the user session compares the attribute types for type discrepancies and generates a mapping file. This procedure is repeated for each of the meta-definitions the user wishes to manually map.

When an adapter starts up at runtime, it reads and caches the meta definitions of the objects it will be processing and any associated mapping files. The object meta definitions are used as a template object for purposes of providing quick instantiation of an object. When an object is dequeued, a look-up is performed to determine if the object requires mapping. If the object is to be mapped from one type to another, a MapObjects() method is used to perform validation and mapping. The adapter then performs its specific function. When the Enqueue operation is performed, an Enqueue() method invokes ValidateObject() to verify that the output object adheres to the definition in the meta-model.

In accordance with one embodiment of the invention, all adapters are written in C++ and the visual interface is written is JAVA. Communication between C++ processes and the JAVA visual interface is provided through interaction with the configuration files, although an approach involving direct file access with buffered writes may be employed to avoid simultaneous access of half written data. A direct file access approach supports non-distributed systems or systems distributed over shared file systems. More advanced distribution may be supported through shell buffers and socket communication techniques. For example, a visual interface running on machine A may send a GetQView request to the monitoring process running a machine B. The monitoring process may then run the GetQView process from shell, get its output from the stdout buffer, and send the result back via a socket.

The JAVA Foundation Class (JFC) provides a comprehensive set of components which may be used to implement a visual interface of the present invention having some or all of the features described herein. A suitable version of JFC is the 1.0.1 release, which may be bundled with JDK 1.1.* and the JAVA WORKSHOP 2.0. The visual interface of the present invention may implemented as a standalone JAVA application, rather than an applet, which removes any dependency on a particular Web Browser's JAVA support.

As was referred to previously, Examples #3–#5 below define the content of the various configuration files used by the visual data integration system in accordance with one embodiment of the present invention. In particular, Example #3 provides a detailed content definition for the Project File configuration, Example #4 provides a detailed content definition for the Component Instance configuration, and Example #5 provides a detailed content definition for the Component configuration.

The Project File configuration, which references a list of instance configurations to be created at deployment time, is read and updated only by the visual interface 501, an example of which, including textual descriptions, is provided below as Example #3:

EXAMPLE #3

Project File<project name>.sxp

[project configuration]
% Storage type, whether using File storage or some other database storage
% Note-copied to<inst name>.cfg on setting
Storage Type=[FILE][ORACLE]

% name of the error queue to be used for this project
% Note-copied to<inst name>.cfg on setting Error Queue=<string>

% There is a group beginning with [<instance name>] for each component
% instance defined in the project
[instance name]

% name of the component to be displayed in System View of UI
System Name=<string>

% name of the component to be displayed in Business View of UI
Business Name=<string>

% X-coordinate to render the icon at (origin on left-increment right)
X-Coordinate=<int>

% Y-coordinate to render the icon at (origin at top-increment down)
Y-Coordinate=<int>

% Name of the component this instance corresponds to
Component Name=<string>

% Component path off set from 'Components' subdirectory
Component Path=<string>

Optional-Icon to display for the component (base icon name without
% state)-implement for second release|
Icon Name=<string>

[instance name]

The Component Instance configuration, an example of which is provided below as Example #4, is created by the GUI at component deployment time. Some of the parameters are copied over from the <project name>.sxp file or the <Comp name>.cfg file.

EXAMPLE #4

<inst name>.cfg

[Project Configuration]

% this is configuration that is created at component development time
% in the lab and should not be customized
% name of the error queue to be used for this project
% copied from <project name>.sxp when changed there
Error Queue=<string>

[Static Configurable]

% this is configuration whose default is set at component development
% time, but may be changed during deployment if the component is not
% running
% Optional-Input Queues for this component
Input Queues=<queue name>, . . . ,<queue name>

% Optional-Output Queues for this component
Output Queues=<queue name>, . . . ,<queue name>

% List of default input meta-models supported
Input MetaModels=<data definition>, . . . ,<data definition>

% List of default input meta-models supported
Output MetaModels=<data definition>, . . . ,<data definition>

[Runtime Configurable]

% on instantiation, these are copied from component configuration file to the instance configuration file.
% These are parameters whose default is set at component development
% time, but may be changed during deployment even when the component is running
% This parameters controls the maximum size to which the trace/log file
% grows to. The value is an integer-unit is Kbytes.
Trace Or Log File Size=100

% This parameter represents the error-level that is currently turned on
Error Level=NONE|CRITICAL|MAJOR|WARNING % The following parameters are used to turn ON/OFF individual tracing
% levels
Application Trace=OFF System Trace=OFF Application Information=OFF System Information=OFF Audit=OFF % This parameter controllers the maximum number of threads that the
% ThreadController would allow to run concurrently.
Maximum Threads=10

% This parameter determines the size of the stack for threaded operations
% when using the thread controller object
Stack Size=1024

% This parameter determines the number of threads dedicated to perform
% dequeue operations from each input queue.
Dequeue Threads=2

% This parameter is used to turn the queuing performance monitor ON/OFF
Queue Monitor=ON % This parameter is used to turn the system performance monitor ON/OFF
System Resource Monitor=ON % This parameter controls the interval at which statistics are reported
% by the performance monitor.
Monitor Interval=10

% This parameter controls the maximum size to which the performance

% monitor log grows to.
Monitor Log File Size=100

The Component configuration is created by the developer of a component at development time. There are four types of parameters, including non-configurable, static-configurable, runtime configurable, and project configurable parameters. Non-configurable parameters are parameters that are defined by the developer and are not intended to be modified at deployment time or runtime. Static configurable parameters are parameters whose default is set at component development time, but may be changed at deployment time, such as by providing overriding definitions in the <project name>.sxp file. Static configurable parameters are not intended to be changed at runtime.

Runtime configurable parameters are parameters that are copied on instance creation to the <inst name>.cfg file. These parameters can be modified at run-time through the visual interface and the new values of parameters are stored in the <inst name>.cfg file. Project configurable parameters are parameters that are copied from <component name>.cfg file to the <project name>.sxp file at project creation time, and can be modified in the <project name>.sxp file at runtime. It is noted that each component may have component-specific groups, and that these groups behave like runtime configurable parameters.

A set of parameters associated with a typical Component configuration file are provided below in Example #5:

EXAMPLE #5

```
<comp name>.cfg

[
ParamName=Icon Name
GroupName=Project Configurable
Comment=Default icon to display for the component
Type=String
Range=
Default=<icon name>.ico
ReadAccess=<SysIntegration|SysManagement|BusIntegration|BusManagement|UserName>
WriteAccess=<SysIntegration|SysManagement|BusIntegration|BusManagement|UserName>
]
[
ParamName=System Name
GroupName=Project Configurable
Comment= Default name to be displayed in System View of UI
Type=String
Range=
Default= <default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Business Name
GroupName=Project Configurable
Comment= Default name of the comp. to be displayed in Business View.
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Min Input Queues
GroupName=Non-Configurable
Comment= Minimum number of input queues for the component
Type=Numeric
Range=
Default=<default value>
ReadAccess==<SysIntegration|SysManagement|BusIntegration|BusManagement|UserName>
WriteAccess==<SysIntegration|SysManagement|BusIntegration|BusManagement|UserName>
]
[
ParamName=Max Input Queues
GroupName=Non-Configurable
Comment=Maximum number of input queued for the component
Type=Numeric
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Min Output Queues
GroupName=Non-Configurable
Comment=Minimum number of output queues for the component
Type=Numeric
Range=
Default=<default value>
```

-continued

```
<comp name>.cfg

ReadAccess=<SysIntegration|SysManagement|BusIntegration|BusManagement|UserName>
WriteAccess=<SysIntegration|SysManagement|BusIntegration|BusManagement|UserName>
]
[
ParamName=Max Output Queues
GroupName=Non-Configurable
Comment= Maximum number of output queued for the component
Type=Numeric
Range=
Default=<default value>
ReadAccess==<SysIntegration|SysManagement|BusIntegration|BusManagement|UserName>
WriteAccess==<SysIntegration|SysManagement|BusIntegration|BusManagement|UserName>
]
[
ParamName=SysIntegration Dblclk
GroupName=Non-Configurable
Comment= System Integration command to be run when dbl-click on icon.
Type=String
Range=
Default=<default value>
ReadAccess= <SysIntegration|SysManagement|BusIntegration|BusManagement|UserName>
WriteAccess=<SysIntegration|SysManagement|BusIntegration|BusManagement|UserName>
]
[
ParamName=SysManagement Dblclk
GroupName=Non-Configurable
Comment=System Management command to be run when double clicked on comp
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=BusIntegration Dblclk
GroupName=Non-Configurable
Comment=Business Integration command to be run when dbl-clk on icon
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=BusManagement Dblclk
GroupName=Non-Configurable
Comment=Buss. Management command to be run when double clicked on icon
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Run Command
GroupName=Non-Configurable
Comment= Command to run the component.
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Stop Command
GroupName=Non-Configurable
Comment= Command to stop the component
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Reconfig Command
GroupName=Non-Configurable
Comment= Command to reconfig the component
```

-continued

```
<comp name>.cfg
```

```
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Input Queues
GroupName=Static Configurable
Comment= Input Queues for this component
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Output Queues
GroupName=Static Configurable
Comment= Output Queues for this component
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Input MetaModels
GroupName=Static Configurable
Comment= List of default input meta-models supported
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Output MetaModels
GroupName=Static Configurable
Comment= List of default output meta-models supported
Type=String
Range=
Default=<default value>
ReadAccess=<SysIntegration|SysManagement|BusIntegration|BusManagement|UserName>
WriteAccess=<SysIntegration|SysManagement|BusIntegration|BusManagement|UserName>
]
[
ParamName=Trace Or Log File Size
GroupName=Runtime Configurable
Comment= the maximum size to which the trace/log file
Type=Numeric
Range=
Default=100
ReadAccess=<SysIntegration|SysManagement|BusIntegration|BusManagement|UserName>
WriteAccess=<SysIntegration|SysManagement|BusIntegration|BusManagement|UserName>
]
[
ParamName=Error Level
GroupName=Runtime Configurable
Comment= the error-level that is currently turned on
Type=String
Range=
Default=NONE
ReadAccess=<SysIntegration|SysManagement|BusIntegration|BusManagement|UserName>
WriteAccess=<SysIntegration|SysManagement|BusIntegration|BusManagement|UserName>
]
[
ParamName=Application Trace
GroupName=Runtime Configurable
Comment=Application level trace switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
```

-continued

```
<comp name>.cfg
```

ParamName=System Trace
GroupName=Runtime Configurable
Comment=System level trace switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
ParamName=Application Information
GroupName=Runtime Configurable
Comment=Application information level trace switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
ParamName=System Information
GroupName=Runtime Configurable
Comment=System Info. Level trace switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
ParamName=Audit
GroupName=Runtime Configurable
Comment=Audit switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
ParamName=Maximum Threads
GroupName=Runtime Configurable
Comment= Max threads that ThreadController would allow concurrently
Type=Numeric
Range=
Default=10
ReadAccess=<SysIntegration|SysManagement|BusIntegration|BusManagement|UserName>
WriteAccess=<SysIntegration|SysManagement|BusIntegration|BusManagement|UserName>
]
[
ParamName=Stack Size
GroupName=Runtime Configurable
Comment= the size of the stack for threaded operations
Type=Numeric
Range=
Default=1024
ReadAccess=<SysIntegration|SysManagement|BusIntegration|BusManagement|UserName>
WriteAccess=<SysIntegration|SysManagement|BusIntegration|BusManagement|UserName>
]
[
ParamName=Dequeue Threads
GroupName= Runtime Configurable
Comment= # threads dedicated to perform dequeue from each input queue
Type=Numeric
Range=
Default=2
ReadAccess=<SysIntegration|SysManagement|BusIntegration|BusManagement|UserName>
WriteAccess=<SysIntegration|SysManagement|BusIntegration|BusManagement|UserName>
]
[
ParamName=Queue Monitor
GroupName=Runtime Configurable
Comment=Queue Performance Monitor switch
Type=String
Range=
Default=OFF
ReadAccess=<SysIntegration|SysManagement|BusIntegration|BusManagement|UserName>

-continued

```
<comp name>.cfg

WriteAccess=<SysIntegration|SysManagement|BusIntegration|BusManagement|UserName>
]
[
ParamName=System Resource Monitor
GroupName=Runtime Configurable
Comment=the system performance monitor switch
Type=String
Range=
Default=OFF
ReadAccess=<SysIntegration|SysManagement|BusIntegration|BusManagement|UserName>
WriteAccess=<SysIntegration|SysManagement|BusIntegration|BusManagement|UserName>
]
[
ParamName=Monitor Interval
GroupName=Runtime Configurable
Comment=interval(in secs) at which statistics are reported
Type=Numeric
Range=
Default=600
ReadAccess=<SysIntegration|SysManagement|BusIntegration|BusManagement|UserName>
WriteAccess=<SysIntegration|SysManagement|BusIntegration|BusManagement|UserName>
]
[
ParamName=Monitor Log File Size
GroupName=Runtime Configurable
Comment= the maximum size to which the performance monitor log grows
Type=Numeric
Range=
Default=100
ReadAccess=<SysIntegration|SysManagement|BusIntegration|BusManagement|UserName>
WriteAccess=<SysIntegration|SysManagement|BusIntegration|BusManagement|UserName>
]
```

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of visually implementing a data interchange system for transporting data, the data comprising informational content and a protocol, the method comprising:

constructing a graphical representation of source data exchange elements and destination data exchange elements of the data interchange system between which only the informational content of the data is to be transported;

establishing graphical connections between selected source and destination data exchange elements so as to produce a graphical representation of the data interchange system;

determining validity of the graphical connections using input/output requirement models associated with the connected source and destination data exchange elements and particular informational content of the data to be transported therebetween;

transforming the graphical representation of the data interchange system into a runtime deployment of the data interchange system; and presenting, to a user, selected information developed from the runtime deployment of the data interchange system using one of a plurality of user selectable visual views.

2. The method according to claim 1, further comprising manually mapping the graphical connections between particular source and destination data exchange elements using associated input/output requirement models in response to an inability to transport the particular informational content of the data between the particular source and destination data exchange elements.

3. The method according to claim 1, wherein presenting selected information further comprises presenting business information associated with the informational content of the data transmitted through the graphical connections.

4. The method according to claim 1, wherein presenting selected information further comprises presenting system information associated with the source and destination data exchange elements of the data exchange system.

5. The method according to claim 1, wherein presenting selected information further comprises presenting performance information associated with transmission of the informational content of the data through the graphical connections.

6. The method according to claim 1, wherein presenting selected information further comprises presenting error information associated with the informational content of the data transmitted through the graphical connections.

7. The method according the claim 1, wherein constructing the graphical representation of source elements and destination data exchange elements further comprises moving source and destination data exchange element icons respectively representative of the source and destination data exchange elements from a first region of a visual interface to a second region of the visual interface.

8. The method according to claim 7, wherein establishing graphical connections between selected source and destination data exchange elements further comprises establishing graphical links between selected source and destination data exchange element icons within the second region of the visual interface.

9. The method according to claim 8, wherein establishing graphical connections between selected source and destination data exchange elements further comprises marking erroneous graphical links with indicia indicative of an incompatibility between the first and second data exchange elements.

10. A method of visually developing a data communications interface through which data passes, the data comprising informational content and a protocol, the method comprising:

visually depicting a first data exchange component and a data exchange second component between which only the informational content of the data is to be transported;

visually linking the first data exchange component with the second data exchange component using a respective first and second data definition model so as to visually define the data communications interface; and transforming the visually defined data communications interface into a runtime deployment of the data communications interface.

11. The method according to claim 10, further comprising determining validity of the visual link using input/output criteria associated with particular informational content of the data to be transported between the first and second data exchange components.

12. The method according to claim 10, wherein the first and second data definition models comprise data input and data output requirements of the respective first and second data exchange components.

13. The method according to claim 10, wherein visually linking the first and second data exchange components further comprises using the first and second data definition models to verify the efficacy of the visual link between the first and second data exchange components, the first and second data definition models defining data input and data output requirements of the respective first and second data exchange components.

14. The method according to claim 10, further comprising manually mapping the visual link between the first and second data exchange components using the first and second data definition models in response to an incompatibility between the first and second data exchange components.

15. The method according to claim 10, further comprising presenting, to a user, selected information developed from the runtime deployment of the data communications interface.

16. The method according to claim 10, further comprising presenting, to a user, selected information developed from the runtime deployment of the data communications interface using one of a plurality of user selectable visual views.

17. The method according to claim 10, further comprising presenting, to a user, business, performance, or error information associated with the informational content of the data transmitted through the data communications interface.

18. The method according to claim 10, further comprising presenting, to a user, system information associated with the first and second data exchange components of the data communications interface.

19. The method according the claim 10, wherein visually depicting the first and second data exchange components further comprises moving first and second data exchange component icons respectively representative of the first and second data exchange components from a first region of a visual interface to a second region of the visual interface.

20. The method according to claim 19, wherein visually linking the first and second data exchange components further comprises establishing a graphical connection between the first and second data exchange component icons within the second region of the visual interface.

21. The method according to claim 20, wherein visually linking the first and second data exchange components further comprises marking the graphical connection with indicia indicative of an incompatibility between the first and second data exchange components.

22. A method of visually developing a data communications interface through which data passes, the data comprising informational content and a protocol, the method comprising:

visually depicting a first data exchange component and a second data exchange component between which only the informational content of the data is to be transported;

visually linking the first data exchange component with the second data exchange component so as to visually define the data communications interface; and verifying the utility of the visual link between the first and the second data exchange components using first and second data definition models, the first and second data definition models defining data input and data output requirements of the respective first and second data exchange components.

23. The method according to claim 22, further comprising manually mapping the visual link between the first and second data exchange components using the first and second data definition models in response to an incompatibility between the first and second data exchange components.

24. The method according to claim 22, further comprising transforming the visually defined data communications interface into a runtime deployment of the data communications interface.

25. The method according to claim 24, further comprising presenting, to a user, selected business, system, performance or error information developed from the runtime deployment of the data communications interface.

26. The method according to claim 22, further comprising presenting, to a user, system information associated with the first and second data exchange components of the data communications interface.

27. The method according the claim 22, wherein visually depicting the first and second data exchange components further comprises moving first and second data exchange component icons respectively representative of the first and second data exchange components from a first region of a visual interface to a second region of the visual interface.

28. The method according to claim 22, wherein visually linking the first and second data exchange components further comprises establishing a graphical connection between the first and second data exchange component icons within the second region of the visual interface.

29. The method according to claim 28, wherein visually linking the first and second data exchange components further comprises marking the graphical connection with indicia indicative of an incompatibility between the first and second data exchange components.

30. A system for visually implementing a data interchange system through which data passes, the data comprising informational content and a protocol, the system comprising:

a display;

an input device actuatable by a user for placing graphical representations of source data exchange components and destination data exchange components of the data interchange system on the display, the input device further actuatable by a user for establishing graphical connections between selected source and destination data exchange elements with which only the informational content of the data is transported therebetween so as to produce a graphical representation of the data interchange system; and a processor coupled to the input device and the display, the processor transforming the graphical representation of the data exchange system into a runtime deployment of the data exchange system using data definition models associated with the source and destination data exchange components.

31. The system of claim 30, wherein the processor determines validity of the graphical connections between the selected source and destination data exchange components.

32. The system of claim 30, wherein the processor determines validity of the graphical connections between the selected source and destination data exchange components using respective source and destination data definition models, the source and destination data definition models defining data input and data output requirements of the respective source and destination data exchange components.

33. The system of claim 30, wherein the input device is actuatable by the user to manually map erroneous graphical connections between incompatible source and destination data exchange components.

34. The system of claim 30, wherein the input device is actuatable by the user to selectively present on the display selected information developed from the runtime deployment of the data interchange system.

35. The system of claim 30, wherein the input device is actuatable by the user to select one of a plurality of visual views for presenting information developed from the runtime deployment of the data interchange system on the display.

36. The system of claim 35, wherein the information comprises business, performance, or error information associated with the informational content of the data transmitted through the data interchange system.

37. The system of claim 35, wherein the information comprises system information associated with the source and destination data exchange components of the data exchange system.

38. A system for visually implementing a data interchange system through which data passes, the data comprising informational content and a protocol, the system comprising:

a display;

an input device actuatable by a user for placing graphical representations of source and destination data exchange components of the data interchange system within the display, the input device further actuated by a user for establishing graphical connections between selected source and destination data exchange components with which only the informational content of the data is transported therebetween so as to produce a graphical representation of the data interchange system; and a processor coupled to the input device and the display, the processor verifying the utility of the graphical connections between the selected source and destination data exchange components using associated source and destination input/output requirement files, the source and destination input/output requirement files defining data input and data output requirements of the respective source and destination data exchange components.

39. The system of claim 38, wherein the input device is actuatable by the user to manually map erroneous graphical connections between incompatible source and destination data exchange components.

40. The system of claim 38, wherein the processor transforms the graphical representation of the data interchange system into a runtime deployment of the data interchange system.

41. The system of claim 40, wherein the input device is actuatable by the user to selectively present on the display selected information developed from the runtime deployment of the data interchange system.

42. A system for visually implementing a data interchange system through which data passes, the data comprising informational content and a protocol, the system comprising:

means for constructing a graphical representation of source and destination data exchange elements of the data interchange system;

means for establishing graphical connections between selected source and destination data exchange elements with which only the informational content of the data is transported therebetween so as to produce a graphical representation of the data interchange system;

means for determining validity of the graphical connections using input/output data requirement models associated with the connected source and destination data exchange elements; and means for transforming the graphical representation of the data interchange system into a runtime deployment of the data interchange system.

43. A system for visually developing a data communications interface through which data passes, the data comprising informational content and a protocol, the interface comprising:

means for graphically depicting a first data exchange component and a second data exchange component with which only the informational content of the data is transported therebetween;

means for graphically linking the first component with the second data exchange component so as to graphically define the data communications interface; and means for transforming the graphically defined data communications interface into a runtime deployment of the data communications interface using data definition models associated with the first and second data exchange components.

44. A system for visually developing a data communications interface through which data passes, the data comprising informational content and a protocol, the interface comprising:

means for graphically depicting a first data exchange component and a second data exchange component with which only the informational content of the data is transported therebetween;

means for graphically linking the first data exchange component with the second data exchange component so as to visually define the data communications interface; and means for verifying the utility of the graphical link between the first and the second data exchange components using first and second data definition models, the first and second data definition models defining data input and data output requirements of the respective first and second data exchange components.

45. A computer readable medium tangibly embodying a program executable for visually implementing a data communications interface through which data passes, the data comprising informational content and a protocol, the medium comprising:

visually depicting a first data exchange component and a second data exchange component with which only the informational content of the data is transported therebetween;

visually linking the first data exchange component with the second data exchange component so as to visually define the data communications interface; and transforming the visually defined data communications interface into a runtime deployment of the data communications interface using data definition models associated with the first and second data exchange components.

46. A computer readable medium tangibly embodying a program executable for visually implementing a data communications interface through which data passes, the data comprising informational content and a protocol, the medium comprising:

visually depicting a first data exchange component and a second data exchange component with which only the informational content of the data is transported therebetween;

visually linking the first data exchange component with the second data exchange component so as to visually define the data communications interface; and verifying the utility of the visual link between the first and the second data exchange components using first and second data definition models, the first and second data definition models defining data input and data output requirements of the respective first and second data exchange components.

* * * * *